United States Patent
Sugimoto et al.

(10) Patent No.: US 9,619,871 B2
(45) Date of Patent: Apr. 11, 2017

(54) IMAGE PROCESSING DEVICE, IMAGING APPARATUS, IMAGE PROCESSING METHOD, AND PROGRAM

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/288,485

(22) Filed: Oct. 7, 2016

(65) Prior Publication Data
US 2017/0069064 A1 Mar. 9, 2017

Related U.S. Application Data

(63) Continuation of application No. PCT/JP2015/059603, filed on Mar. 27, 2015.

(30) Foreign Application Priority Data

Apr. 11, 2014 (JP) .................................. 2014-082136

(51) Int. Cl.
G06T 5/00 (2006.01)
G06K 9/52 (2006.01)
H04N 5/232 (2006.01)

(52) U.S. Cl.
CPC .............. *G06T 5/003* (2013.01); *G06K 9/522* (2013.01); *H04N 5/23293* (2013.01); *G06T 2207/20024* (2013.01)

(58) Field of Classification Search
USPC ................................................. 348/606–612
See application file for complete search history.

(56) References Cited

U.S. PATENT DOCUMENTS 6,207,360 B1 * 3/2001 Ishikawa .............. G03C 7/3022
430/419
2008/0297643 A1 12/2008 Ono
(Continued)

FOREIGN PATENT DOCUMENTS

JP 60-171574 A 9/1985
JP 11-225275 A 8/1999
(Continued)

OTHER PUBLICATIONS

International Search Report (PCT/ISA/210) issued in PCT/JP2015/059603, mailed on Jun. 23, 2015.
(Continued)

*Primary Examiner* — Paulos M Natnael
(74) *Attorney, Agent, or Firm* — Birch, Stewart, Kolasch & Birch, LLP

(57) ABSTRACT

An image processing unit 36 includes a frequency analysis unit 40, an optical characteristic acquisition unit 42, and a filter acquisition unit 44. The frequency analysis unit 40 acquires data in the frequency domain of each of first image data and second image data which are acquired by capturing an object image using a first optical system and a second optical system, respectively. The optical characteristic acquisition unit 42 compares the data in the frequency domain of the first image data with the data in the frequency domain of the second image data to acquire frequency characteristic data related to optical characteristics of the second optical system. The filter acquisition unit 44 acquires a sharpening filter associated with the second optical system from a plurality of sharpening filters associated with the first optical system.

24 Claims, 22 Drawing Sheets

(56) References Cited

U.S. PATENT DOCUMENTS

| | | |
|---|---|---|
| 2009/0128655 A1 | 5/2009 | Yoneyama |
| 2009/0128668 A1 | 5/2009 | Yoneyama |
| 2013/0176495 A1* | 7/2013 | Gohshi .................. H04N 5/208 348/629 |
| 2013/0247117 A1* | 9/2013 | Yamada .................. G08C 17/02 725/93 |
| 2016/0239946 A1* | 8/2016 | Naruse .................... G06T 5/003 |
| 2017/0004603 A1* | 1/2017 | Irie .................... H04N 5/23229 |

FOREIGN PATENT DOCUMENTS

| | | |
|---|---|---|
| JP | 2009-010944 A | 1/2009 |
| JP | 2009-124567 A | 6/2009 |
| JP | 2009-124569 A | 6/2009 |
| JP | 2012-156715 A | 8/2012 |

OTHER PUBLICATIONS

Written Opinion (PCT/ISA/237) issued in PCT/JP2015/059603, mailed on Jun. 23, 2015.

English translation of International Preliminary Report on Patentability (PCT/IB/373) issued in PCT/JP2015/059603, mailed on Oct. 12, 2016.

English translation of International Search Report (PCT/ISA/210) issued in PCT/JP2015/059603, mailed on Jun. 23, 2015.

English translation of Written Opinion (PCT/ISA/237) issued in PCT/JP2015/059603, mailed on Jun. 23, 2015.

\* cited by examiner

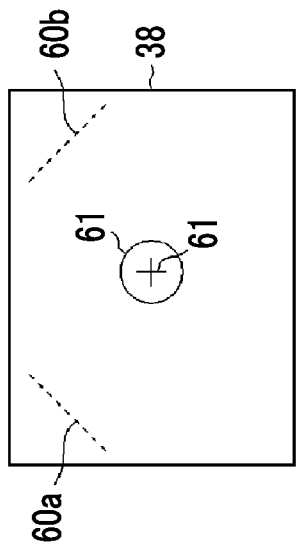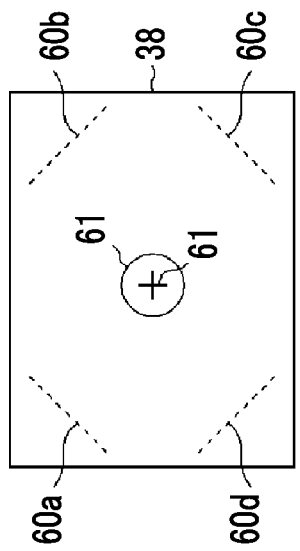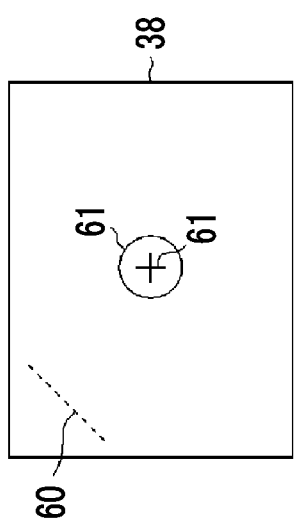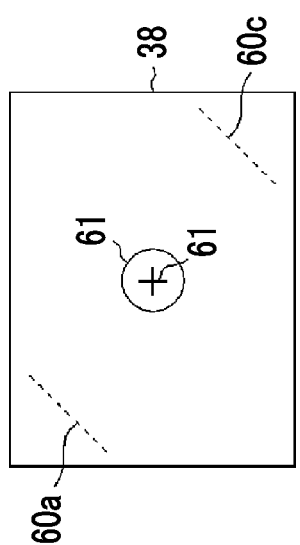

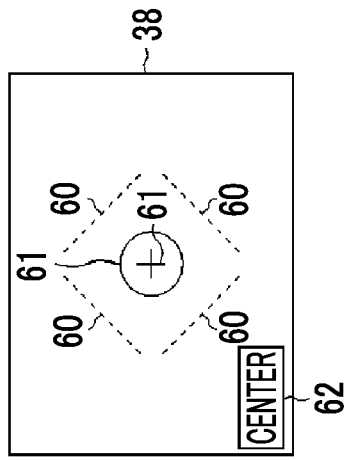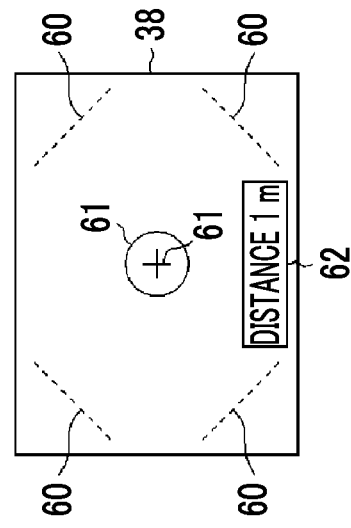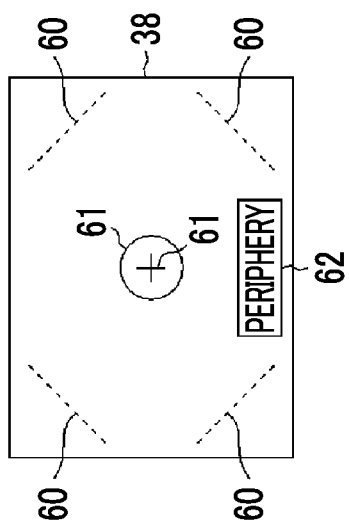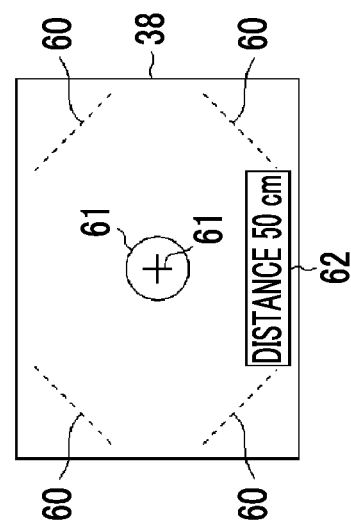

IMAGE PROCESSING DEVICE, IMAGING APPARATUS, IMAGE PROCESSING METHOD, AND PROGRAM

CROSS-REFERENCE TO RELATED APPLICATIONS

This application is a Continuation of PCT International Application No. PCT/JP2015/059603 filed on Mar. 27, 2015, which claims priority under 35 U.S.C §119(a) to Patent Application No. 2014-082136 filed in Japan on Apr. 11, 2014, all of which are hereby expressly incorporated by reference into the present application.

BACKGROUND OF THE INVENTION

1. Field of the Invention

The present invention relates to an image processing device, an imaging apparatus, an image processing method, and a program, and more particularly, to a sharpening process.

2. Description of the Related Art

In general, a sharpening process is performed in order to improve the quality of image data which is captured and acquired by an imaging apparatus such as a digital camera. The sharpening process applies a sharpening filter to image data to remove the blurring of an image. For example, a contour enhancement process or a point image restoration process is known as the sharpening process.

For example, in an image processing device disclosed in JP2012-156715A, an image recovery process is performed using a recovery filter based on an optical transfer function.

In imaging systems disclosed in JP2009-124567A and JP2009-124569A, a restoration process is performed using a kernel Wiener filter.

SUMMARY OF THE INVENTION

It is preferable that a sharpening filter which is applied to image data to be subjected to a sharpening process is determined according to imaging conditions or optical characteristics of an optical system. When a sharpening process is performed using a sharpening filter corresponding to imaging conditions different from the actual imaging conditions or a sharpening filter corresponding to optical characteristics different from the optical characteristics of an optical system used to capture images, in some cases, a sufficient sharpening effect is not obtained and image quality deteriorates.

Therefore, in a case in which a sharpening process is performed, it is preferable to accurately check imaging conditions or optical characteristics of the optical system and to select an appropriate filter. In particular, in a case in which a sharpening filter based on an optical transfer function (for example, a point spread function) is created, it is necessary to specify an appropriate optical transfer function corresponding to the optical characteristics of the optical system used to capture images or other imaging conditions (for example, a F-number and a focal length).

For example, in the image processing device disclosed in JP2012-156715A, a plurality of images are analyzed to acquire optical transfer characteristics or a recovery filter having two-dimensional data is used as the optical transfer characteristics. In the imaging systems disclosed in JP2009-124567A and JP2009-124569A, image data is analyzed to acquire blurred point image data and a restoration coefficient corresponding to a burred state is calculated on the basis of the blurred point image data.

In the device and the systems disclosed in JP2012-156715A, JP2009-124567A, and JP2009-124569A, in a case in which information required for the image recovery process and the image restoration process (sharpening process) is appropriately acquired, it is possible to appropriately perform the processes. However, in a case in which the information required for the processes is not capable of being acquired, it is difficult to perform the processes.

In the actual sharpening process, in some cases, it is difficult to acquire the optical characteristics of the optical system or other imaging conditions. For example, in a case in which a sharpening process based on an optical transfer function is performed in a digital camera, in general, an optical transfer function or a sharpening filter provided in a lens unit or a camera body is used. However, in some cases, neither the lens unit nor the camera body includes the sharpening filter or the optical transfer function of the lens unit (optical system) which has been actually used.

In a case in which the camera body acquires imaging conditions, such as a F number or a focal length, through communication with the lens unit, the lens unit which has been used to capture images may not correspond to the camera body and may not have a communication function with the camera body. In this case, it is difficult for the camera body to acquire the imaging conditions from the lens unit. Furthermore, in a case in which the lens unit which has been used to capture images has a communication function with the camera body, a communication failure is likely to occur according to a usage environment (for example, impact and temperature) and it is then difficult for the camera body to acquire the imaging conditions from the lens unit.

As described above, in some cases, it is difficult to acquire the optical transfer function of the optical system or the imaging conditions due to various factors. However, there is a demand for performing the sharpening process as appropriately as possible under these conditions.

The invention has been made in view of the above-mentioned problems and an object of the invention is to provide a technique that can acquire a sharpening filter which can be used even in a case in which it is difficult to acquire an optical transfer function of an optical system or imaging conditions.

An aspect of the invention relates to an image processing device comprising: a frequency analysis unit that acquires data in a frequency domain of each of first image data which is acquired by capturing an object image using a first optical system and second image data which is acquired by capturing an object image using a second optical system; an optical characteristic acquisition unit that compares the data in the frequency domain of the first image data with the data in the frequency domain of the second image data to acquire frequency characteristic data related to optical characteristics of the second optical system; and a filter acquisition unit that acquires a sharpening filter associated with the second optical system from a plurality of sharpening filters associated with the first optical system, on the basis of the frequency characteristic data related to the optical characteristics of the second optical system.

According to this aspect, even if it is difficult to acquire an optical transfer function or imaging conditions in a sharpening process for the second image data acquired by capturing the object image using the second optical system, it is possible to acquire the "sharpening filter associated with the second optical system" from the plurality of sharpening filters associated with the first optical system.

Preferably, the filter acquisition unit acquires, as the sharpening filter associated with the second optical system, a sharpening filter which is acquired from the plurality of sharpening filters associated with the first optical system and has frequency characteristics closest to those of the frequency characteristic data related to the optical characteristics of the second optical system.

According to this aspect, it is possible to acquire a sharpening filter with high accuracy of sharpening as the sharpening filter associated with the second optical system.

Preferably, the optical characteristic acquisition unit acquires the frequency characteristic data related to the optical characteristics of the second optical system on the basis of a ratio of the data in the frequency domain of the first image data to the data in the frequency domain of the second image data.

According to this aspect, it is possible to acquire a sharpening filter with high accuracy of sharpening as the sharpening filter associated with the second optical system, on the basis of the ratio of the data in the frequency domain of the first image data to the data in the frequency domain of the second image data.

Preferably, the first image data is not subjected to a sharpening process using a sharpening filter which is acquired from the plurality of sharpening filters associated with the first optical system according to imaging conditions. Preferably, when the data in the frequency domain of the first image data is represented by a, the data in the frequency domain of the second image data is represented by b, and a response indicating a ratio of the first image data after the sharpening filter which is acquired from the plurality of sharpening filters associated with the first optical system according to imaging conditions of the first image data is applied to the first image data before the sharpening filter is applied for each frequency is represented by c, the optical characteristic acquisition unit acquires the frequency characteristic data related to the optical characteristics of the second optical system which is represented by a/b×c.

According to this aspect, it is possible to acquire the sharpening filter associated with the second optical system, considering the sharpening process for the first image data.

Preferably, in a case in which the response of each of the plurality of sharpening filters associated with the first optical system for each frequency is represented by a ratio of the image data after the sharpening filter is applied to the image data before the sharpening filter is applied for each spatial frequency, the filter acquisition unit acquires the sharpening filter associated with the second optical system from the plurality of sharpening filters associated with the first optical system, on the basis of an area surrounded by the frequency characteristic data related to the optical characteristics of the second optical system which is acquired by the optical characteristic acquisition unit and the response of the sharpening filter in a coordinate system in which a horizontal axis indicates the spatial frequency and a vertical axis indicates the response.

According to this aspect, it is possible to acquire a sharpening filter with high accuracy of sharpening as the sharpening filter associated with the second optical system, on the basis of the area surrounded by the "frequency characteristic data related to the optical characteristics of the second optical system" and the "response of the sharpening filter" in the coordinate system.

Preferably, the filter acquisition unit acquires, as the sharpening filter associated with the second optical system, a sharpening filter which is selected from the plurality of sharpening filters associated with the first optical system and has the smallest area surrounded by the frequency characteristic data related to the optical characteristics of the second optical system which is acquired by the optical characteristic acquisition unit and the response thereof in the coordinate system.

According to this aspect, since the sharpening filter with the smallest area is acquired as the sharpening filter associated with the second optical system, it is possible to acquire a sharpening filter with high accuracy of sharpening as the sharpening filter associated with the second optical system.

Preferably, the first image data and the second image data are acquired by capturing the same object image.

According to this aspect, since the first image data and the second image data have similar image characteristics, it is possible to accurately acquire the sharpening filter associated with the second optical system from the plurality of sharpening filters associated with the first optical system.

Preferably, the image processing device further comprises a filter processing unit that applies the sharpening filter acquired by the filter acquisition unit to the second image data.

According to this aspect, it is possible to perform an appropriate sharpening process for the second image data.

Preferably, the optical characteristics of the second optical system are an optical transfer function of the second optical system.

According to this aspect, it is possible to acquire the sharpening filter associated with the second optical system on the basis of the optical transfer function of the second optical system. The optical transfer function (OTF) includes a point spread function (PSF), a modulation transfer function (MTF), and a phase transfer function (PTF).

Preferably, the image processing device further comprises an image data acquisition unit that acquires evaluation data for a plurality of second image data items acquired by capturing an object image using the second optical system and acquires the second image data, in which data in the frequency domain is acquired by the frequency analysis unit, from the plurality of second image data items on the basis of the evaluation data.

According to this aspect, it is possible to acquire a sharpening filter with high accuracy of sharpening as the sharpening filter associated with the second optical system on the basis of the evaluation data.

Preferably, the plurality of second image data items are acquired under different conditions.

According to this aspect, it is possible to acquire appropriate second image data from the plurality of second image data items acquired under different conditions on the basis of the evaluation data.

Preferably, the plurality of second image data items have different exposure conditions.

According to this aspect, it is possible to acquire appropriate second image data from the plurality of second image data items having different exposure conditions on the basis of the evaluation data.

Preferably, the image data acquisition unit acquires the second image data, in which the data in the frequency domain is acquired by the frequency analysis unit, from the plurality of second image data items on the basis of the number of components of the plurality of second image data items in a specific frequency range.

According to this aspect, it is possible to acquire appropriate second image data from the plurality of second image data items on the basis of the number of components in a specific frequency range.

Preferably, the image data acquisition unit acquires second image data having the largest number of components in the specific frequency range as the second image data, in which the data in the frequency domain is acquired by the frequency analysis unit, from the plurality of second image data items.

According to this aspect, it is possible to acquire the second image data having the largest number of components in the specific frequency range as appropriate second image data.

Preferably, the specific frequency range is included in a range that is equal to or greater than one eighth of a sampling frequency of each of the plurality of second image data items and is equal to or less than one fourth of the sampling frequency.

Preferably, the sharpening filter is based on an optical transfer function of the first optical system.

According to this aspect, it is possible to acquire the sharpening filter based on the optical transfer function as the sharpening filter associated with the second optical system.

Preferably, the sharpening filter is not based on an optical transfer function of the first optical system.

According to this aspect, it is possible to acquire a sharpening filter which is not based on the optical transfer function as the sharpening filter associated with the second optical system.

Preferably, the filter acquisition unit acquires a plurality of sharpening filters associated with a plurality of image heights as the sharpening filter associated with the second optical system from the plurality of sharpening filters associated with the first optical system.

According to this aspect, it is possible to acquire a sharpening filter with high accuracy which corresponds to an image height as the sharpening filter associated with the second optical system.

Another aspect of the invention relates to an imaging apparatus comprising an imaging element that receives an object image which has passed through an optical system and generates captured image data and the above-mentioned image processing device.

According to this aspect, in the imaging apparatus, even if it is difficult to acquire an optical transfer function or imaging conditions in a sharpening process for the second image data which is acquired by capturing an object image using the second optical system, it is possible to acquire the "sharpening filter associated with the second optical system" from a plurality of sharpening filters associated with the first optical system.

Preferably, the imaging apparatus further comprises a storage unit that stores the data in the frequency domain of the first image data. Preferably, the frequency analysis unit acquires the data in the frequency domain of the first image data from the storage unit and acquires the data in the frequency domain of the second image data obtained by capturing the object image using the second optical system and the imaging element.

According to this aspect, the data in the frequency domain of the first image data is acquired from the storage unit and the data in the frequency domain of the second image data is acquired by capturing the object image.

Preferably, the imaging apparatus further comprises a display unit, a display control unit that controls the display unit, and the second optical system. Preferably, the display control unit displays a guide portion for prompting a user to take a first object image on the display unit and the second image data is the captured image data which is generated by an imaging operation prompted by the guide portion.

According to this aspect, the user is prompted by the guide portion to simply acquire the second image data. The "captured image data which is generated by the imaging operation prompted by the guide portion" may be captured image data which is generated by the user taking an image on the basis of the displayed guide portion. Therefore, for example, captured image data that is generated by an imaging operation in a state in which the guide portion is displayed on the display unit is referred to as the "captured image data which is generated by the imaging operation prompted by the guide portion".

Preferably, the imaging apparatus further comprises an image determination unit that determines whether the captured image data which is generated by the imaging operation prompted by the guide portion meets a first criterion. Preferably, the second image data is the captured image data that meets the first criterion.

According to this aspect, it is possible to acquire the second image data meeting the first criterion.

Preferably, in a case in which the captured image data which is generated by the imaging operation prompted by the guide portion does not meet the first criterion, the display control unit displays the guide portion for prompting the user to take the first object image on the display unit again.

According to this aspect, it is possible to simply acquire the second image data meeting the first criterion.

Still another aspect of the invention relates to an imaging processing method including: acquiring data in the frequency domain of each of first image data which is acquired by capturing an object image using a first optical system and second image data which is acquired by capturing an object image using a second optical system; comparing the data in the frequency domain of the first image data with the data in the frequency domain of the second image data to acquire frequency characteristic data related to optical characteristics of the second optical system; and acquiring a sharpening filter associated with the second optical system from a plurality of sharpening filters associated with the first optical system, on the basis of the frequency characteristic data related to the optical characteristics of the second optical system.

Yet another aspect of the invention relates to a program that causes a computer to perform: a step of acquiring data in the frequency domain of each of first image data which is acquired by capturing an object image using a first optical system and second image data which is acquired by capturing an object image using a second optical system; a step of comparing the data in the frequency domain of the first image data with the data in the frequency domain of the second image data to acquire frequency characteristic data related to optical characteristics of the second optical system; and a step of acquiring a sharpening filter associated with the second optical system from a plurality of sharpening filters associated with the first optical system, on the basis of the frequency characteristic data related to the optical characteristics of the second optical system.

According to the invention, even if it is difficult to acquire an optical transfer function or imaging conditions in the sharpening process for the second image data acquired by capturing the object image using the second optical system, it is possible to accurately acquire the "sharpening filter associated with the second optical system" from a plurality of sharpening filters associated with the first optical system.

BRIEF DESCRIPTION OF THE DRAWINGS

FIGS. 9A to 9D are diagrams illustrating an example of an imaging guide in a display unit.

FIGS. 12A to 12D are diagrams illustrating still another example of the imaging guide in the display unit.

DESCRIPTION OF THE PREFERRED EMBODIMENTS

Embodiments of the invention will be described with reference to the accompanying drawings. In the following description, an example in which the invention is applied to a digital camera (imaging apparatus) which can be connected to a computer (personal computer (PC)) will be described.

Figure 1:
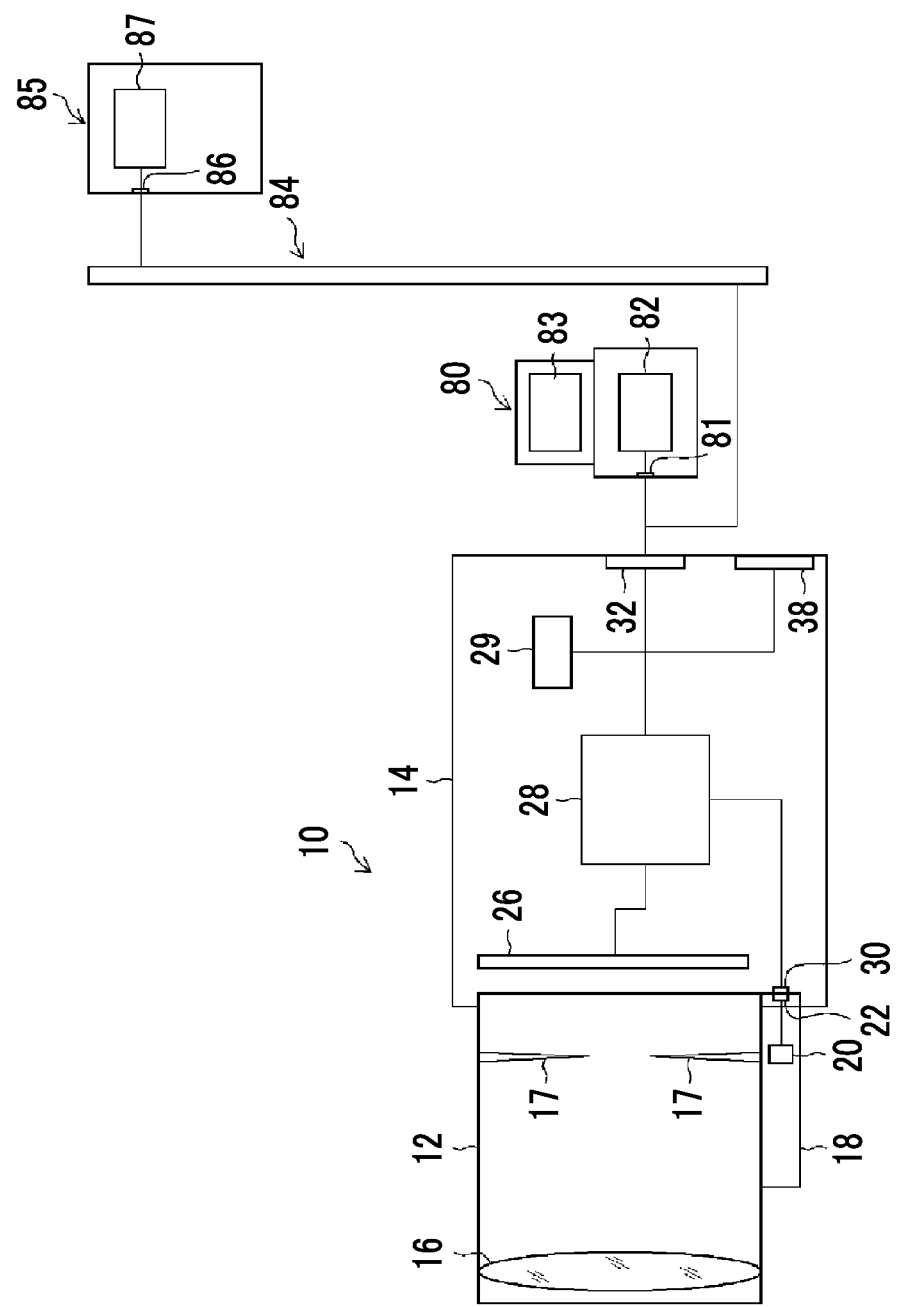
FIG. 1 is a block diagram illustrating the outline of a digital camera connected to a computer.

FIG. 1 is a block diagram illustrating the outline of the digital camera which is connected to the computer.

A digital camera 10 comprises an interchangeable lens unit 12 and a camera body 14 including an imaging element 26. The lens unit 12 and the camera body 14 are electrically connected to each other through a lens unit input/output unit 22 of the lens unit 12 and a camera body input/output unit 30 of the camera body 14.

The lens unit 12 comprises an optical system including, for example, a lens 16 and a diaphragm 17 and an optical system operation unit 18 that controls the optical system. The optical system operation unit 18 includes a lens unit controller 20 that is connected to the lens unit input/output unit 22 and an actuator (not illustrated) that operates the optical system. The lens unit controller 20 controls the optical system through the actuator, on the basis of a control signal which is transmitted from the camera body 14 through the lens unit input/output unit 22. For example, the lens unit controller 20 performs focus control or zoom control using the movement of the lens or controls the value (position) of the diaphragm 17.

The imaging element 26 of the camera body 14 includes a condensing microlens, color filters, such as red, green, and blue (R, G, and B) filters, and an image sensor (photodiode: for example, a complementary metal oxide semiconductor (CMOS) or a charge-coupled device (CCD)). The imaging element 26 converts object image light which is emitted through the optical system (for example, the lens 16 and the diaphragm 17) of the lens unit 12 into an electric signal and transmits an image signal (captured image data) to a body controller 28. That is, in this example, the imaging element 26 receives the object image which has passed through the optical system (for example, the lens 16 and the diaphragm 17), generates captured image data (hereinafter, referred to as "image data"), and transmits the image data to the body controller 28 (an "image processing unit 36" which will be described below).

Figure 2:
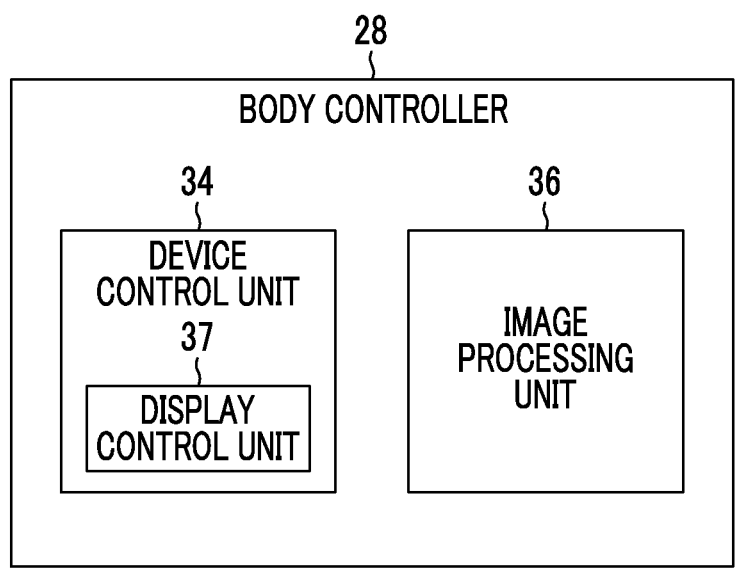
FIG. 2 is a block diagram illustrating the outline of the functional structure of a body controller.

FIG. 2 is a block diagram illustrating the outline of the functional structure of the body controller 28.

The body controller 28 includes a device control unit 34 and the image processing unit (image processing device) 36 and controls the overall operation of the camera body 14.

For example, the device control unit 34 has a function of controlling the output of image data from the imaging element 26, a function of generating a control signal for controlling the lens unit 12 and transmitting the control signal to the lens unit 12 (lens unit controller 20) through the camera body input/output unit 30, or a function of transmitting image data (for example, RAW data or Joint Photographic Experts Group (JPEG) data) before and after image processing to an external apparatus (for example, a computer 80) that is connected through an input/output interface 32. In this example, the device control unit 34 includes a display control unit 37 that controls a display unit 38 provided in the camera body 14. In addition, the device control unit 34 appropriately controls other types of devices provided in the digital camera 10.

The image processing unit 36 can perform any image processing for the image data transmitted from the imaging element 26, if necessary. For example, the image processing unit 36 appropriately performs various types of image processing, such as a sensor correction process, demosaic (synchronization) processing, a pixel interpolation process, a color correction process (for example, an offset correction process, white balance processing, color matrix processing, and a gamma conversion process), RGB image processing (for example, a tone correction process and an exposure correction process), an RGB/YCrCb conversion process, and an image compression process. In addition, in this example, the image processing unit 36 performs a "sharpening process" which will be described below.

The image data that has been subjected to image processing by the body controller 28 is stored in an image storage unit 29 which is, for example, a flash memory. The image data stored in the image storage unit 29 is transmitted to, for example, the computer 80 connected to the input/output interface 32 (see FIG. 1). In a case in which the image storage unit 29 is detachably and attachably provided in the camera body 14, the image data stored in the image storage unit 29 is transmitted to, for example, the computer 80 that is connected to the image storage unit 29 detached from the camera body 14. The format of the image data transmitted from the digital camera 10 (image storage unit 29) to, for example, the computer 80 is not particularly limited and may be any format such as a RAW format, a JPEG format, or a tagged image file format (TIFF). Therefore, the body controller 28 may associate a plurality of related data items, such as header information (imaging information (for example, an imaging date and time, the type of digital camera, the number of pixels, and a F number)), main image data, and thumbnail image data to form one image file, as in an exchangeable image file format (Exif), and may transmit the image file to the computer 80.

The computer 80 is connected to the digital camera 10 through the input/output interface 32 of the camera body 14 and a computer input/output unit 81 and receives data such as the image data transmitted from the camera body 14. A computer controller 82 controls the overall operation of the computer 80, performs imaging processing for the image data transmitted from the digital camera 10, or controls communication with, for example, a server 85 that is connected to the computer input/output unit 81 through a network 84 such as the Internet. The computer 80 includes a display 83. For example, the content of the process of the computer controller 82 is displayed on the display 83, if necessary. The user operates input means (not illustrated), such as a keyboard, to input data or commands to the computer controller 82, to control the computer 80, or control devices (the digital camera 10 and the server 85) connected to the computer 80, while checking the content displayed on the display 83.

The server 85 includes a server input/output unit 86 and a server controller 87. The server input/output unit 86 is a transmission and reception connection unit with an external apparatus, such as the digital camera 10 or the computer 80, and is connected to the body controller 28 of the digital camera 10 or the computer input/output unit 81 of the computer 80 through the network 84. The server controller 87 has a function of transmitting and receiving data to and from the body controller 28 or the computer controller 82 if necessary, a function of downloading data to the digital camera 10 or the computer 80, or a function of performing arithmetic processing and transmitting the result of the arithmetic processing to the digital camera 10 or the computer 80, in cooperation with the body controller 28 or the computer controller 82 in response to a control instruction signal from the digital camera 10 or the computer 80.

Each controller (the lens unit controller 20, the body controller 28, the computer controller 82, and the server controller 87) comprises circuits required for a control process. Each controller comprises an arithmetic processing circuit (for example, a central processing unit (CPU)), a memory, or the like. In addition, a communication system between the digital camera 10, the computer 80, and the server 85 may be a wired communication system or a wireless communication system. The computer 80 and the server 85 may be integrally provided. The computer 80 and/or the server 85 may be omitted. The digital camera 10 may have a communication function with the server 85 and data may be directly transmitted and received between the digital camera 10 and the server 85.

Next, an image data sharpening process performed in the body controller 28 (image processing unit 36) illustrated in FIG. 2 will be described. In each of the following embodiments, a sharpening process in a case in which the image processing unit 36 (body controller 28) that performs the sharpening process is not capable of acquiring all of imaging conditions, such as a F number and a focal length, which are basic information for selecting a sharpening filter due to unavailability of communication or a communication failure will be described.

An example in which the camera body 14 (body controller 28) performs the sharpening process will be described below. However, a portion of or the entire sharpening process may be performed by other controllers (for example, the lens unit controller 20, the computer controller 82, and the server controller 87). Hereinafter, the sharpening process performed by the image processing unit 36 will be described. As described above, the image processing unit 36 performs various types of image processing other than the sharpening process before and/or after the sharpening process. Processing units related to image processing other than the sharpening process which is performed by the image processing unit 36 will not be described and illustrated.

First Embodiment

This embodiment relates to an example in which a user takes the same scene using a "lens unit 12 corresponding to the camera body 14" and a "lens unit 12 that does not correspond to the camera body 14" and the frequency responses of the obtained images are compared to acquire a sharpening filter which can be used for image data captured by the "lens unit 12 that does not correspond to the camera body 14".

The "sharpening filter" is not particularly limited and may be a filter that is based on an optical transfer function of an optical system or a filter that is not based on the optical transfer function of the optical system. That is, a filter that is created on the basis of an optical transfer function (OTF) including a point spread function (PSF), a modulation transfer function (MTF), and a phase transfer function (PTF) may be used as the "sharpening filter". Alternatively, for example, a contour correction filter which is determined regardless of the optical transfer function may be used as the sharpening filter.

In the following description, a "lens unit 12 that can appropriately transmit and receive imaging information between the lens unit 12 (lens unit controller 20) and the camera body 14 (body controller 28) and can supply the imaging information to the body controller 28" is referred to as a "first optical system". A "lens unit 12 that is not capable of appropriately transmitting and receiving imaging information between the lens unit 12 (lens unit controller 20) and the camera body 14 (body controller 28) and is not capable of supplying the imaging information to the body controller 28" is referred to as a "second optical system".

Figure 3:
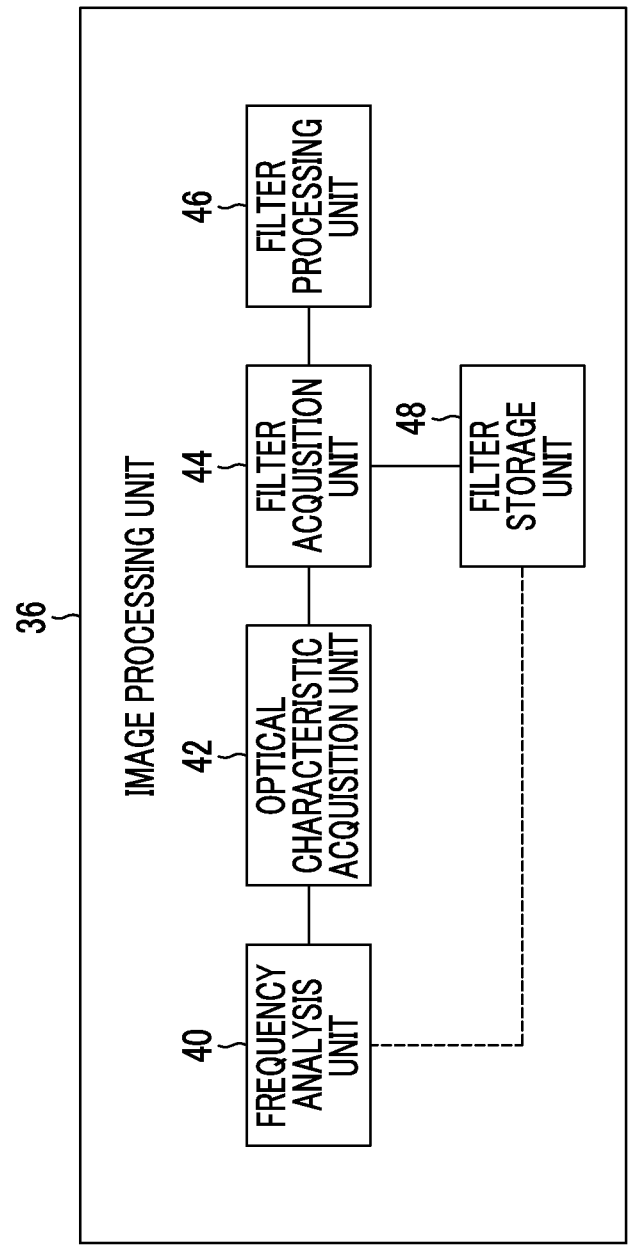
FIG. 3 is a block diagram illustrating an example of the functional structure of an image processing unit according to a first embodiment.

FIG. 3 is a block diagram illustrating an example of the functional structure of an image processing unit 36 according to the first embodiment. In this example, the image processing unit 36 includes a frequency analysis unit 40, an optical characteristic acquisition unit 42, a filter acquisition unit 44, a filter processing unit 46, and a filter storage unit 48 (storage unit).

The frequency analysis unit 40 acquires data in the frequency domain of each of "image data (hereinafter, referred to as "first image data") obtained by capturing an object image using the first optical system" and "image data (hereinafter, referred to as "second image data") acquired by capturing an object image using the second optical system".

Figure 4:
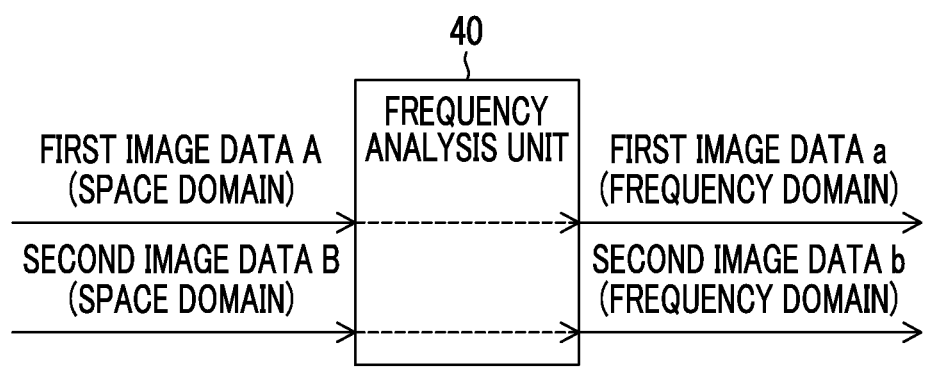
FIG. 4 is a conceptual diagram illustrating an example of the process of a frequency analysis unit.

FIG. 4 is a conceptual diagram illustrating an example of the process of the frequency analysis unit 40. Image data represented by the space domain which is output from the imaging element 26 (see FIG. 1) is input to the frequency analysis unit 40. The frequency analysis unit 40 performs a process to which the principle of Fourier transform is applied to create "image data represented by the frequency domain" from the input "image data represented by the space domain" and outputs the created image data. That is, the frequency analysis unit 40 converts "first image data A represented by the space domain" into "first image data a represented by the frequency domain" and converts "second image data B represented by the space domain" into "second image data b represented by the frequency domain". A process for creating the "image data represented by the frequency domain" from the "image data represented by the space domain" is not particularly limited. For example, the frequency analysis unit 40 may perform a process using fast Fourier transform (FFT).

In this example, the first image data and the second image data mean image data acquired by capturing the same object image. For example, first, the user takes an object image, using the "lens unit 12 (first optical system) that can appropriately transmit and receive imaging information between the lens unit 12 (lens unit controller 20) and the camera body 14 (body controller 28)", and the first image data is acquired. Then, the user changes the lens unit 12. Then, the user takes the same object image as the first image data, using the "lens unit 12 (second optical system) that is not capable of appropriately transmitting and receiving imaging information between the lens unit 12 (lens unit controller 20) and the camera body 14 (body controller 28)", and the second image data is acquired. In this way, the frequency analysis unit 40 can acquire the first image data and the second image data. The user may be guided such that a series of imaging processes is appropriately performed. For example, guidance may be displayed on the display unit 38 under the control of the body controller 28 (display control unit 37) to prompt the user to perform the imaging process. In addition, the first image data and the second image data may be directly supplied from the imaging element 26 to the frequency analysis unit 40. Alternatively, the first image data and the second image data may be temporarily stored in a memory, such as the image storage unit 29, and may be supplied from the memory to the frequency analysis unit 40.

The optical characteristic acquisition unit 42 illustrated in FIG. 3 compares data in the frequency domain of the first image data with data in the frequency domain of the second image data to acquire frequency characteristic data related to the optical characteristics of the second optical system.

Here, the "frequency characteristic data related to the optical characteristics of the second optical system" is not particularly limited and characteristics which can be recovered by the sharpening process can be used as the "optical characteristics of the second optical system". For example, an optical transfer function of the second optical system may be used as the "optical characteristics of the second optical system".

Figure 5:
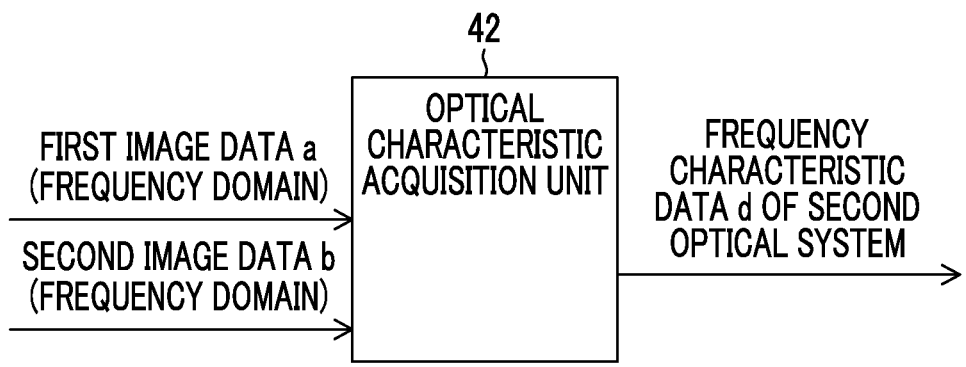
FIG. 5 is a conceptual diagram illustrating an example of the process of an optical characteristic acquisition unit.

FIG. 5 is a conceptual diagram illustrating an example of the process of the optical characteristic acquisition unit 42. The "first image data a represented by the frequency domain" and the "second image data b represented by the frequency domain" generated by the frequency analysis unit 40 are input to the optical characteristic acquisition unit 42. The optical characteristic acquisition unit 42 acquires "frequency characteristic data d related to the optical characteristics of the second optical system" on the basis of the "first image data a represented by the frequency domain" and the "second image data b represented by the frequency domain".

In this example, the optical characteristic acquisition unit 42 acquires the "frequency characteristic data d related to the optical characteristics of the second optical system" on the basis of the ratio of the "data (first image data a) in the frequency domain of the first image data" to the "data (second image data b) in the frequency domain of the second image data".

"Data which has been subjected to the sharpening process" and "data which has not been subjected to the sharpening process" are assumed as the "data (first image data a) in the frequency domain of the first image data" which is used in the optical characteristic acquisition unit 42. Therefore, preferably, the optical characteristic acquisition unit 42 determines whether the "data (first image data a) in the frequency domain of the first image data" which is to be used is the "data which has been subjected to the sharpening process" or the "data which has not been subjected to the sharpening process" and changes a method for acquiring the "frequency characteristic data d related to the optical characteristics of the second optical system" on the basis of the determination result.

For example, in a case in which the "data (first image data a) in the frequency domain of the first image data" which is used in the optical characteristic acquisition unit 42 is the "data which has been subjected to the sharpening process", the sharpening process has already been reflected in the first image. In this case, the "frequency characteristic data d related to the optical characteristics of the second optical system" may be represented by the ratio of the "data (first image data a) in the frequency domain of the first image data" to the "data (second image data b) in the frequency domain of the second image data" (d=a/b).

On the other hand, in a case in which the "data (first image data a) in the frequency domain of the first image data" which is used in the optical characteristic acquisition unit 42 is the "data which has not been subjected to the sharpening process", it is necessary to consider the influence of the sharpening process on the first image data. That is, in a case in which the first image data used in the optical characteristic acquisition unit 42 has not been subjected to the sharpening process using a sharpening filter that has been acquired from a plurality of sharpening filters associated with the first optical system according to the imaging conditions, for example, the optical characteristic acquisition unit 42 may acquire the "frequency characteristic data d related to the optical characteristics of the second optical system" as follows. That is, for the sharpening filter which is acquired from a plurality of sharpening filters associated with the first optical system according to the imaging conditions of the first image data, when a response indicating the ratio of the "first image data after the sharpening filter is applied" to the "first image data before the sharpening filter is applied" for each frequency is represented by c, the optical characteristic acquisition unit 42 can acquire the "frequency characteristic data d related to the optical characteristics of the second optical system" which is represented by "d=a/b×c".

The filter acquisition unit 44 illustrated in FIG. 3 acquires a sharpening filter associated with the second optical system from the plurality of sharpening filters associated with the first optical system, on the basis of the "frequency characteristic data d related to the optical characteristics of the second optical system".

Figure 6:
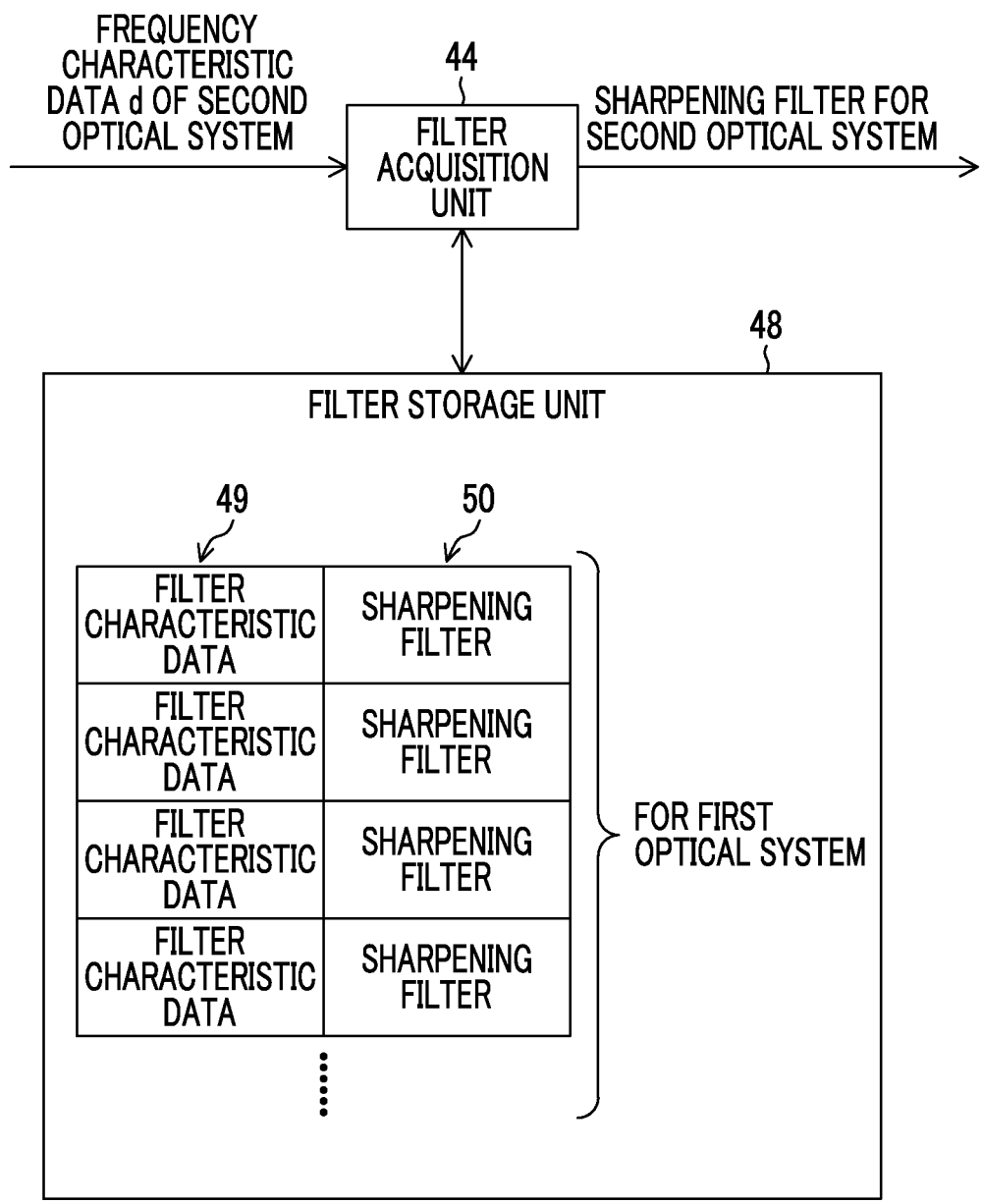
FIG. 6 is a conceptual diagram illustrating an example of the process of a filter acquisition unit.

FIG. 6 is a conceptual diagram illustrating an example of the process of the filter acquisition unit 44. In this example, the filter acquisition unit 44 selects the sharpening filter associated with the second optical system from the "plurality of sharpening filters associated with the first optical system" stored in a filter storage unit 48.

In this example, the filter storage unit 48 stores a plurality of sharpening filters 50 for the first optical system. Each of the sharpening filters 50 for the first optical system is predetermined according to the imaging conditions, considering the optical characteristics of the first optical system. For example, in a case in which the sharpening filter 50 is based on the optical transfer function of the first optical system, since the optical transfer function varies depending on the imaging conditions, each of the "sharpening filters 50 for the first optical system" is determined on the basis of an appropriate optical transfer function which is determined for each imaging condition. In a case in which the sharpening filter 50 is not based on the optical transfer function of the first optical system, similarly, each of the "sharpening filters 50 for the first optical system" is determined on the basis of appropriate criteria which are determined for each imaging condition. The imaging conditions which are criteria for selecting the plurality of sharpening filters 50 are not particularly limited. For example, the sharpening filters 50 corresponding to a F number, a focal length, an object distance, and brightness (for example, exposure, a histogram, and a degree of saturation) when image data to which the sharpening filter is to be applied is acquired may be stored in the filter storage unit 48.

In this example, filter characteristic data 49 indicating the filter characteristics of each of the sharpening filters 50 stored in the filter storage unit 48 is associated with each sharpening filter 50. Each filter characteristic data item 49 indicates the characteristics of the sharpening filter 50 associated therewith. For example, the response (response=image data after the sharpening filter is applied/image data before the sharpening filter is applied) of each of the plurality of sharpening filters 50 associated with the first optical system for each frequency may be used as the filter characteristic data 49.

In this example, the filter acquisition unit 44 selects a sharpening filter having characteristics closest to the "frequency characteristic data d related to the optical characteristics of the second optical system" from a stored sharpening filter group and uses the selected sharpening filter as the sharpening filter associated with the second optical system. That is, the filter acquisition unit 44 acquires a sharpening filter 50 which is acquired from a plurality of sharpening filters associated with the first optical system and has frequency characteristics closest to the "frequency characteristic data d related to the optical characteristics of the second optical system" acquired by the optical characteristic acquisition unit 42 as the sharpening filter associated with the second optical system. A method for determining whether the sharpening filter 50 has characteristics close to the "frequency characteristic data d related to the optical characteristics of the second optical system" is not particularly limited. It is preferable that the closeness is determined by comparison with "spatial frequency-response" characteristic data which is the sharpening effect of the sharpening filter 50.

The filter acquisition unit 44 may generate the sharpening filter 50. In this case, "information required to generate the sharpening filter 50" is stored in the filter storage unit 48 so as to be associated with the filter characteristic data 49 of the sharpening filter 50 generated from the information. The filter acquisition unit 44 acquires information required to generate the sharpening filter 50 which has characteristics closest to the "frequency characteristic data d related to the optical characteristics of the second optical system", with reference to the filter characteristic data 49, and generates the sharpening filter 50. The "information required to generate the sharpening filter 50" is not particularly limited. In a case in which the sharpening filter 50 is based on the optical transfer function, the optical transfer function is used as the "information required to generate the sharpening filter 50".

Figure 7:
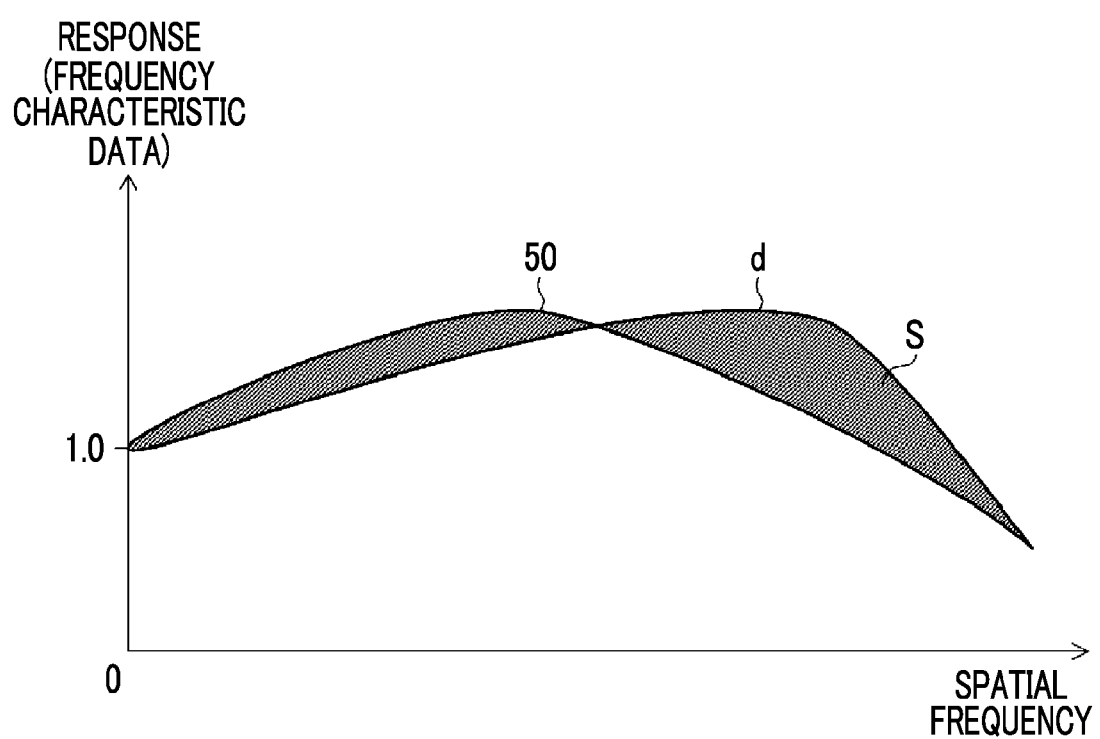
FIG. 7 illustrates a coordinate system for describing an example of the relationship between "frequency characteristic data related to optical characteristics of a second optical system" and a "sharpening filter" associated with a first optical system.

FIG. 7 illustrates a coordinate system for describing an example of the relationship between the "frequency characteristic data d related to the optical characteristics of the second optical system" and the "sharpening filter 50" associated with the first optical system. In FIG. 7, the horizontal axis indicates a spatial frequency and the vertical axis indicates a response and the frequency characteristic data d. The response of the sharpening filter 50 for each frequency illustrated in FIG. 7 is represented as follows: "response=image data after the sharpening filter is applied/image data before the sharpening filter is applied". That is, the response indicates the ratio of image data after the sharpening filter is applied to image data before the sharpening filter is applied for each spatial frequency.

In the coordinate system illustrated in FIG. 7, the filter acquisition unit 44 may determine the closeness between the "frequency characteristic data d related to the optical characteristics of the second optical system" and the "sharpening filter 50", on the basis of the area of a region S which is surrounded by each of the "sharpening filters associated with the first optical system" and the "frequency characteristic data d related to the optical characteristics of the second optical system". That is, the filter acquisition unit 44 can acquire a sharpening filter associated with the second optical system from a plurality of sharpening filters associated with the first optical system, on the basis of the area of the region S (difference region) surrounded by the sharpening filters associated with the first optical system and the "frequency characteristic data d related to the optical characteristics of the second optical system" acquired by the optical characteristic acquisition unit 42. Therefore, for example, the filter acquisition unit 44 may acquire a sharpening filter, which is selected from the plurality of sharpening filters associated with the first optical system and causes the area of the region surrounded by the "frequency characteristic data d related to the optical characteristics of the second optical system" acquired by the optical characteristic acquisition unit 42 and the response of the sharpening filter to be the minimum in the coordinate system illustrated in FIG. 7, as the sharpening filter associated with the second optical system from the filter storage unit 48. In addition, the filter acquisition unit 44 may perform a gain control process in addition to the sharpening filter application process.

The filter processing unit 46 illustrated in FIG. 3 applies the "sharpening filter associated with the second optical system" acquired by the filter acquisition unit 44 to the "second image data acquired by capturing an object image using the second optical system".

A sharpening filter application method of the filter processing unit 46 is not particularly limited. For example, a sharpening filter which is common to all pixels of image data (second image data) may be applied or a sharpening filter to be applied may be changed depending on each pixel or each area of image data. In general, the optical transfer function is different at the center of the optical axis of the optical system and in the periphery of the optical system due to a difference in optical characteristics, such as aberration. Therefore, the sharpening filter to be applied to each pixel or each area of image data may be changed depending on an image height. In this case, the filter acquisition unit 44 acquires a plurality of sharpening filters associated with a plurality of image heights as the sharpening filters associated with the second optical system from the plurality of sharpening filters associated with the first optical system. Then, the filter processing unit 46 applies the plurality of sharpening filters acquired by the filter acquisition unit 44 to the image data (second image data) according to the image height.

Figure 8:
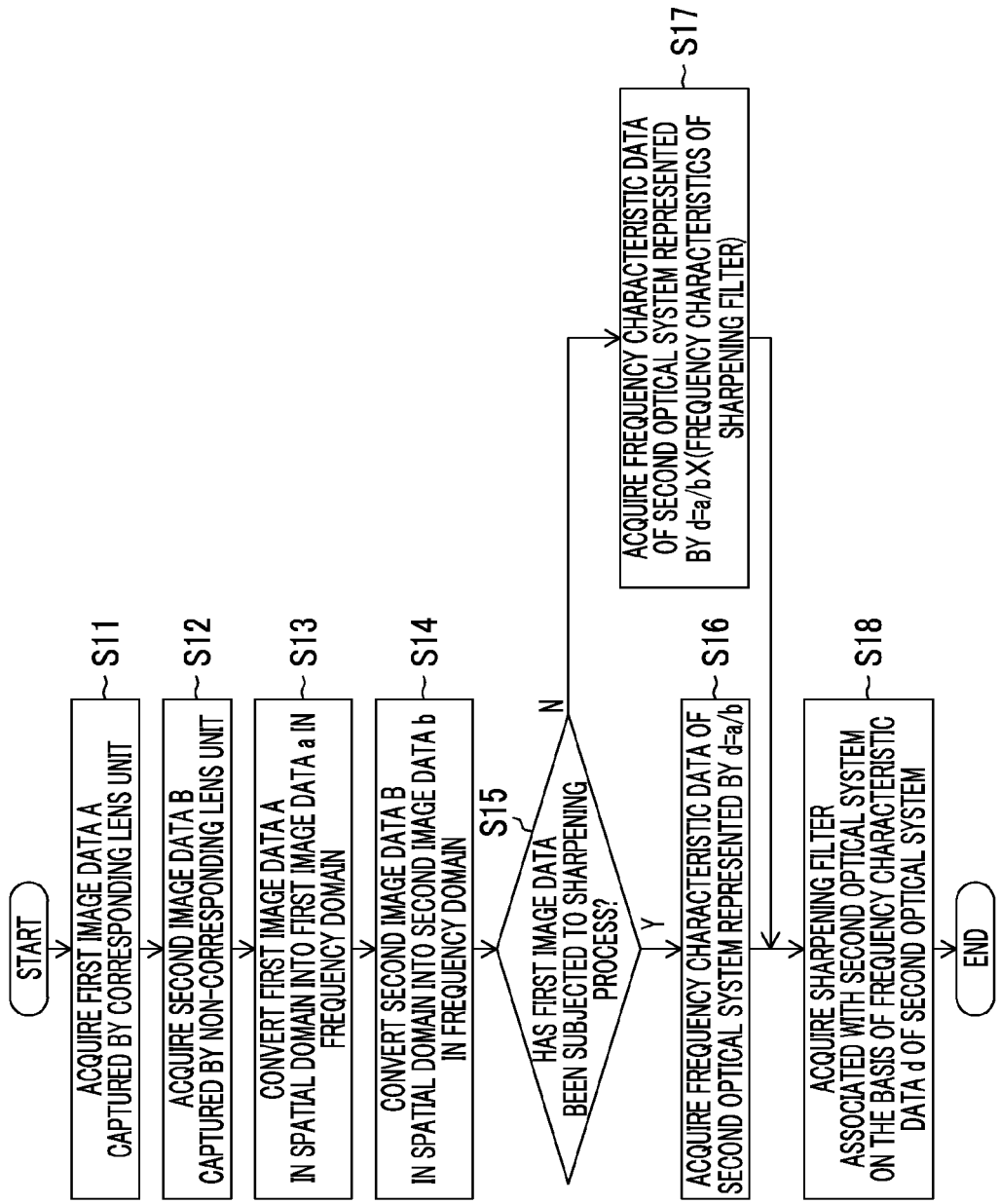
FIG. 8 is a flowchart illustrating an example of the process of the image processing unit according to the first embodiment.

FIG. 8 is a flowchart illustrating an example of the process of the image processing unit 36 according to the first embodiment.

First, the frequency analysis unit 40 acquires the "first image data A represented by the space domain" which is captured using the "lens unit 12 (first optical system) that can appropriately transmit and receive imaging information between the lens unit controller 20 and the body controller 28" (S11 in FIG. 8). In addition, the frequency analysis unit 40 acquires the "second image data B represented by the space domain" which is captured using the "lens unit 12 (second optical system) that is not capable of appropriately transmitting and receiving imaging information between the lens unit controller 20 and the body controller 28" (S12).

Then, the frequency analysis unit 40 converts the "first image data A represented by the space domain" into the "first image data a represented by the frequency domain" (S13), and converts the "second image data B represented by the space domain" into the "second image data b represented by the frequency domain" (S14).

Then, the optical characteristic acquisition unit 42 determines whether the first image data A (first image data a) has been subjected to the sharpening process (S15).

In a case in which it is determined that the first image data A (first image data a) has been subjected to the sharpening process (Y in S15), the optical characteristic acquisition unit 42 acquires the "frequency characteristic data d related to the optical characteristics of the second optical system" which is represented by "d=a/b" (S16). On the other hand, in a case in which it is determined that the first image data A (first image data a) has not been subjected to the sharpening process (N in S15), the optical characteristic acquisition unit 42 acquires the "frequency characteristic data d related to the optical characteristics of the second optical system" which is represented by "d=a/b×c" (S17). Here, "c" indicates the response of a sharpening filter which is acquired from the plurality of sharpening filters associated with the first optical system according to the imaging conditions of the first image data A (first image data a).

Then, the filter acquisition unit 44 acquires the sharpening filter associated with the "lens unit 12 (second optical system) that is not capable of appropriately transmitting and receiving imaging information between the lens unit controller 20 and the body controller 28", on the basis of the "frequency characteristic data d related to the optical characteristics of the second optical system" (S18).

The acquired sharpening filter associated with the "lens unit 12 (second optical system) that is not capable of appropriately transmitting and receiving imaging information between the lens unit controller 20 and the body controller 28" can be applied to the image data captured and acquired by the lens unit 12 (second optical system).

Therefore, the filter processing unit 46 may store the sharpening filter associated with the "lens unit 12 (second optical system) that is not capable of appropriately transmitting and receiving imaging information between the lens unit controller 20 and the body controller 28" which is acquired by the filter acquisition unit 44 and may use the sharpening filter when the sharpening process is performed for the image data captured and acquired by the lens unit 12 (second optical system). For example, the filter processing unit 46 may perform the sharpening process for the image data which is captured and acquired for the period from the "acquisition of the sharpening filter associated with the "lens unit 12 (second optical system) that is not capable of appropriately transmitting and receiving imaging information between the lens unit controller 20 and the body controller 28" to the "detachment of the lens unit 12 (second optical system) from the camera body 14", using the "sharpening filter associated with the lens unit 12 (second optical system)". In addition, the sharpening process using the "sharpening filter associated with the lens unit 12 (second optical system)" acquired by the filter acquisition unit 44 may be switched between an on state and an off state until "the lens unit 12 (second optical system) is detached from the camera body 14".

Second Embodiment

In this embodiment, the detailed description of the same or similar structures and operations as those in the first embodiment will not be repeated.

In this embodiment, data in the frequency domain of the first image data is stored in the filter storage unit 48 (storage unit). For example, a plurality of object images (hereinafter, referred to as "first object images"), such as predetermined charts, are captured using the "lens unit 12 (first optical system) that can appropriately transmit and receive imaging information between the lens unit controller 20 and the body controller 28", while imaging conditions are changed. Frequency characteristic data of captured image data (first image data) which is obtained for each imaging condition is stored in the filter storage unit 48 (storage unit) in advance and the sharpening filter associated with the "lens unit 12 (first optical system)" is stored in the filter storage unit 48 (storage unit) in advance so as to be associated with each imaging condition.

In a case in which the "lens unit 12 (second optical system) that is not capable of appropriately transmitting and receiving imaging information between the lens unit controller 20 and the body controller 28" is mounted on the camera body 14, guidance that prompts a user to take the first object image is performed such that captured image data that is suitable for being compared with the frequency characteristic data of the captured image data acquired using the first optical system, which is stored in the filter storage unit 48, can be acquired and the captured image data (second image data) of the first object image obtained by an imaging process using the "lens unit 12 (second optical system)" is acquired. The frequency analysis unit 40 (see FIG. 3) acquires data (frequency characteristic data) in the frequency domain of the first image data related to the object image (first object image) from the filter storage unit 48 (storage unit) and acquires data in the frequency domain of the second image data using a process of capturing the object image (first object image) using the second optical system and the imaging element 26 (see FIG. 1). Then, the optical characteristic acquisition unit 42 compares the "image data (first image data) captured using the lens unit 12 (first optical system) that can appropriately acquire the imaging conditions" and the "image data (second image data) captured using the lens unit 12 (second optical system) that is not capable of appropriately acquiring the imaging conditions" which are related to the same "first object image" and a difference in optical characteristics between the lens unit 12 (first optical system) and the lens unit 12 (second optical system) is inferred. The filter acquisition unit 44 acquires the sharpening filter associated with the "lens unit 12 (second optical system) that is not capable of appropriately acquiring the imaging conditions" from the sharpening filters associated with the "lens unit 12 (first optical system) that can appropriately acquire the imaging conditions" on the basis of the inference result.

<Imaging Guide>

Next, an example of a method for displaying guidance on the display unit 38 to prompt the user to take the first object image will be described. This example relates to a guide display process in a state in which the "lens unit 12 (second optical system) that is not capable of appropriately transmitting and receiving imaging information between the lens unit controller 20 and the body controller 28" is mounted on the camera body 14.

The display control unit 37 (see FIG. 2) controls the display unit 38 (see FIG. 1) such that a guide portion which prompts the user to take the first object image is displayed on the display unit 38. The user acquires the captured image data (second image data) of the first object image, using the "lens unit 12 (second optical system) that is not capable of appropriately acquiring the imaging conditions", while being supported by the guide portion displayed on the display unit 38. Therefore, in this embodiment, the "second image data" is captured image data which is generated by an imaging operation prompted by the guide portion displayed on the display unit 38.

FIGS. 9A to 9D are diagrams illustrating an example of an imaging guide in the display unit 38. FIGS. 9A to 9D illustrate a guide portion 60 which is displayed on the display unit 38 by the display control unit 37 and the display pattern of the guide portion 60. In the example illustrated in FIGS. 9A to 9D, an auto focus area 61 is displayed at the center of the display unit 38.

In the following description, the terms "right", "left", "lower", and "upper" mean the "right side of the drawings", the "left side of the drawings", the "lower side of the drawings", and the "upper side of the drawings", respectively.

The guide portion 60 illustrated in FIGS. 9A to 9D has a linear shape along a tangential direction of the captured image displayed on the display unit 38. The linear shape of the guide portion 60 is not particularly limited as long as it is linear. For example, the guide portion 60 may be, for example, a solid straight line, a dotted straight line, or a straight line that is translucent such that the captured image is seen.

It is preferable that the guide portion 60 has a linear shape along the sagittal direction or the tangential direction of the captured image. In particular, in a case in which the sharpening filter is based on an optical transfer function, it is preferable that the guide portion 60 is disposed in the sagittal direction or the tangential direction of the captured image in order to adjust the parameters of the sharpening process. That is, in a case in which an image of an object which is aligned with the guide portion 60 disposed in the sagittal direction or the tangential direction of the captured image is captured, it is possible to obtain useful data from the viewpoint of adjusting the parameters of the sharpening filter based on the optical transfer function.

The "guide portion 60 along the sagittal direction or the tangential direction" may deviate from the sagittal direction or the tangential direction in a range in which the deviation does not hinder the effect.

The sagittal direction and the tangential direction are defined on the basis of the captured image. It is preferable that the sagittal direction or the tangential direction is defined on the basis of an optical image projected onto a light receiving surface of the imaging element 26. However, it is difficult to obtain the second image data on the basis of only the image data which is received and acquired by the imaging element 26. Therefore, even if the sagittal direction and the tangential direction are defined on the basis of the captured image, no problems occur. Here, the tangential direction means a direction tangent to the circumference of a circle having the center of the captured image as its center and the sagittal direction means a direction perpendicular to the tangential direction.

In FIG. 9A, as guide display pattern 1, the guide portion 60 is disposed in an upper left region of the display unit 38. The user takes the first object image and acquires captured image data, with reference to the guide portion 60 illustrated in FIG. 9A. In this case, an image (for example, see reference numeral "64a" in FIG. 10 which will be described below) which is determined on the basis of the guide portion 60 illustrated in FIG. 9A is the first object image.

In FIG. 9B, as guide display pattern 2, two guide portions 60a and 60b are disposed in the upper left region and an upper right region of the display unit 38, respectively. The two guide portions 60 illustrated in FIG. 9B are the first guide portion 60a and the second guide portion 60b which is not parallel to the first guide portion 60a. That is, the guide portion (first guide portion) 60a which is disposed in the upper left region and the guide portion (second guide portion) 60b which is disposed in the upper right region of the display unit 38 in FIG. 9B are not parallel to each other.

In FIG. 9C, as guide display pattern 3, two guide portions 60a and 60c are disposed in the upper left region and a lower right region of the display unit 38, respectively. In FIG. 9D, as guide display pattern 4, four guide portions 60a, 60b, 60c, and 60d are disposed in the upper left region, the upper right region, the lower right region, and a lower left region of the display unit 38, respectively.

The display of the guide portion 60 is not limited to the guide display patterns illustrated in FIGS. 9A to 9D and various guide display patterns can be used.

Figure 10:
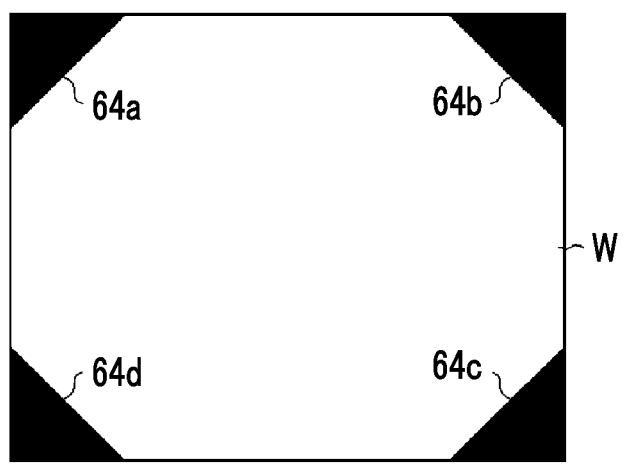
FIG. 10 is a diagram illustrating an example of an object suitable for the guide display illustrated in FIGS. 9A to 9D.

FIG. 10 is a diagram illustrating an example of an object W suitable for the guide display illustrated in FIGS. 9A to 9D. For example, in guide display pattern 1 illustrated in FIG. 9A, it is preferable to capture an image of a black portion, which is represented by reference numeral "64*a*" in FIG. 10, in the object W along the guide portion 60. In guide display pattern 2 illustrated in FIG. 9B, it is preferable to capture the images of black portions, which are represented by reference numerals "64*a*" and "64*b*" in FIG. 10, in the object W along the guide portion 60. In guide display pattern 3 illustrated in FIG. 9C, it is preferable to capture the images of black portions, which are represented by reference numerals "64*a*" and "64*c*" in FIG. 10, in the object W along the guide portion 60. In guide display pattern 4 illustrated in FIG. 9D, it is preferable to capture the images of black portions, which are represented by reference numerals "64*a*", "64*b*", "64*c*", and "64*d*" in FIG. 10, in the object W along the guide portion 60.

Figure 11A:
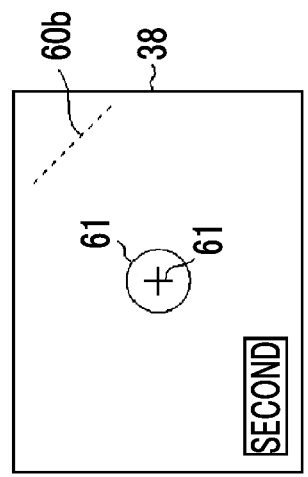
FIGS. 11A to 11D are diagrams illustrating another example of the imaging guide in the display unit.
Figure 11B:
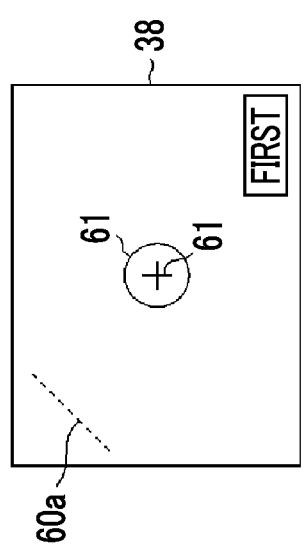
Figure 11C:
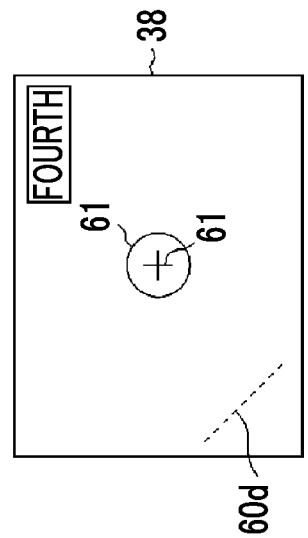
Figure 11D:
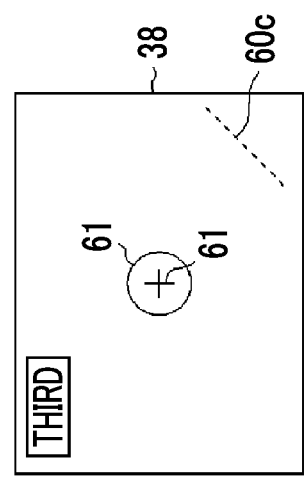

FIGS. 11A to 11D are diagrams illustrating another example of the imaging guide in the display unit 38. In this example, an imaging guide is performed such that the capture of an object which satisfies the display of the guide portions 60 at four corners of the display unit 38 is performed for the display of each of the guide portions 60 at four corners. That is, in this example, first, as illustrated in FIG. 11A, an image which satisfies the guide portion 60*a* disposed on the upper left side is captured. Then, as illustrated in FIG. 11B, an image which satisfies the guide portion 60*b* disposed on the upper right side is captured. As illustrated in FIG. 11C, an image which satisfies the guide portion 60*c* disposed on the lower right side is captured. Then, as illustrated in FIG. 11D, an image which satisfies the guide portion 60*d* disposed on the lower left side is captured. As such, four captured image data items which are assisted and acquired by the guide portions 60*a* to 60*d* illustrated in FIGS. 11A to 11D are acquired as the second image data.

The displayed guide portions 60 are not limited to four illustrated in FIGS. 11A to 11D and an arbitrary number of guide portions 60 may be displayed at different positions on the display unit 38 to prompt the user to take images. According to this example, it is easy to see the object satisfying each of the guide portions 60*a* to 60*d* and it is possible to acquire a captured image that reliably satisfies the guide portions 60*a* to 60*d*.

FIGS. 12A to 12D are diagrams illustrating still another example of the imaging guide in the display unit 38. In this example, in addition to the guide portion 60, an imaging condition display portion 62 is displayed on the display unit 38. That is, the display control unit 37 displays the imaging condition display portion 62 for capturing and acquiring the second image data on the display unit 38 to inform the user of necessary imaging conditions. Therefore, the user can take an image under necessary imaging conditions to acquire the second image data.

Specifically, In FIGS. 12A and 12B, the imaging condition display portion 62 related to an image height position is displayed on the display unit 38. That is, in the example illustrated in FIG. 12A, the acquisition of the second image data in which the guide portion 60 is satisfied in a portion (a peripheral portion of the captured image) with a large image height is assisted. In the example illustrated in FIG. 12B, the acquisition of the second image data in which the guide portion 60 is satisfied in a portion (a central portion of the captured image) with a small image height is assisted. As such, since the guide portion 60 is disposed according to the image height of the captured image, it is possible to acquire the second image data corresponding to the image height.

In FIGS. 12C and 12D, the distance (object distance) to an object is displayed as the imaging condition display portion 62 on the display unit 38. That is, in the example illustrated in FIG. 12C, the acquisition of the second image data in which the distance to the object is 50 cm is assisted. In the example illustrated in FIG. 12D, the acquisition of the second image data in which the distance to the object is 1 m is assisted. As such, since both the guide portion 60 and the imaging condition display portion 62 indicating the distance to the object are displayed on the display unit 38, it is possible to acquire the second image data including the distance to a desired object.

As such, according to the example illustrated in FIGS. 12C and 12D, the imaging condition display portion 62 makes it possible to capture and acquire the second image data under appropriate imaging conditions.

Figure 13:
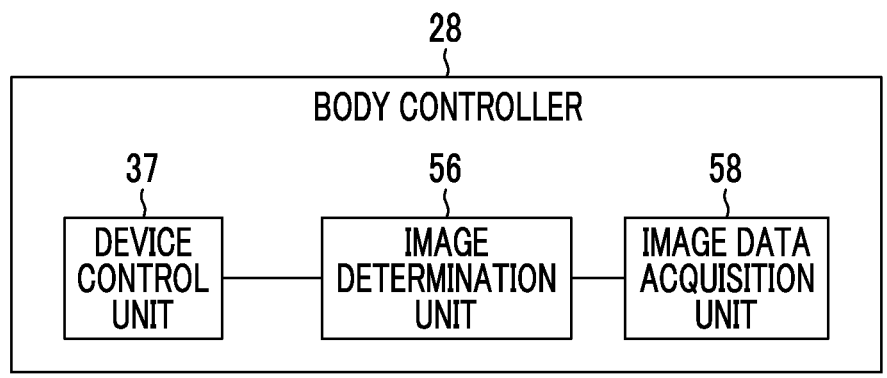
FIG. 13 is a block diagram illustrating an example of the functional structure of a body controller according to a second embodiment.

FIG. 13 is a block diagram illustrating an example of the functional structure of a body controller 28 according to the second embodiment.

The body controller 28 according to this embodiment includes an image determination unit 56 and an image data acquisition unit 58, in addition to the display control unit 37. The image determination unit 56 determines whether image data that has been captured and generated by an imaging operation prompted by the guide portion 60 meets a first criterion. The image data acquisition unit 58 acquires the captured image data which is determined to meet the first criterion by the image determination unit 56 as the "second image data in which data in the frequency domain is acquired by the frequency analysis unit 40 (see FIG. 3)" and transmits the acquired image data to the frequency analysis unit 40. Therefore, the second image data obtained in this embodiment is captured image data meeting the first criterion.

On the other hand, in a case in which the image determination unit 56 determines that the image data that has been captured and generated by the imaging operation prompted by the guide portion 60 does not meet the first criterion, the display control unit 37 displays the guide portion 60 for prompting the user to take the first object image on the display unit 38 again.

The "first criterion" for determining whether the second image data is suitable is not particularly limited. For example, the degree of matching between the guide portion 60 and the first object image which is actually captured may be used as the "first criterion". That is, the image determination unit 56 may determine whether the image data captured by the guidance of the guide portion 60 is appropriate as the second image data, on the basis of the degree of matching.

Specifically, the degree of matching between the guide portion 60 and the captured image data may be determined as the degree of overlap between the angles of view of the guide portion 60 and the captured image data. Here, the term "matching" does not necessarily mean matching in a strict sense. That is, the guide portion 60 may be matched with the captured image data in the range in which the second image data that is usable can be acquired. Specifically, in the first object image of the captured image data, a portion that corresponds to 40% or more of the guide portion 60 may overlap the guide portion 60. Preferably, in the first object image, a portion that corresponds to 60% or more of the guide portion 60 may overlap the guide portion 60. More preferably, in the first object image, a portion that corresponds to 80% or more of the guide portion 60 may overlap the guide portion 60.

Figure 14A:
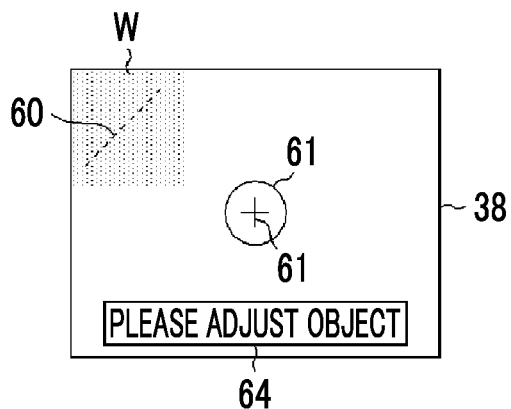
FIGS. 14A and 14B are diagrams illustrating yet another example of the imaging guide in the display unit.
Figure 14B:
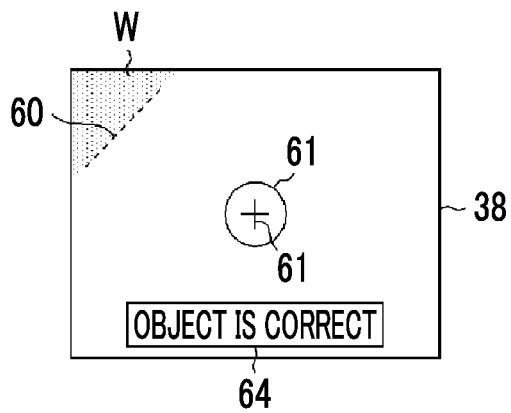

FIGS. 14A and 14B are diagrams illustrating yet another example of the imaging guide in the display unit 38. In this example, the display control unit 37 displays, on the display unit 38, the guide portion 60 and a determination information portion 64 indicating whether the captured image data is appropriate image data which meets the first criterion on the basis of the degree of matching with the guide portion 60.

Specifically, FIG. 14A illustrates a case in which image data that has been captured and acquired by an imaging operation prompted by the guide portion 60 is not sufficiently matched with the guide portion 60 and does not meet the first criterion. In the example illustrated in FIG. 14A, an object W is not matched with the guide portion 60 that is disposed on the upper left side. Therefore, the determination information portion 64 including a message "Please adjust the object" is displayed on the display unit 38. FIG. 14B illustrates a case in which the image data that has been captured and acquired by the imaging operation prompted by the guide portion 60 is sufficiently matched with the guide portion 60 and meets the first criterion. In the example illustrated in FIG. 14B, the object W is matched with the guide portion 60 that is disposed on the upper left side. Therefore, the determination information portion 64 including a message "The object is correct" is displayed on the display unit 38.

Figure 15:
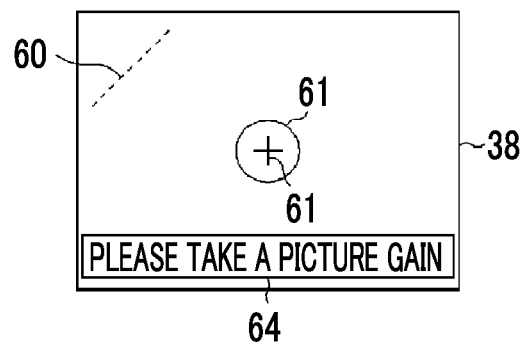
FIG. 15 is a diagram illustrating still yet another example of the imaging guide in the display unit.

FIG. 15 is a diagram illustrating still another example of the imaging guide in the display unit 38. In this example, in a case in which the captured image data does not meet the first criterion, the user is prompted to take an image again. That is, in the example illustrated in FIGS. 14A and 14B, the content of the determination information portion 64 is information that prompts the user to take the image of a different object (see FIG. 14A). In contrast, in the example illustrated in FIG. 15, the content of the determination information portion 64 is information that prompts the user to take an image again.

Figure 16A:
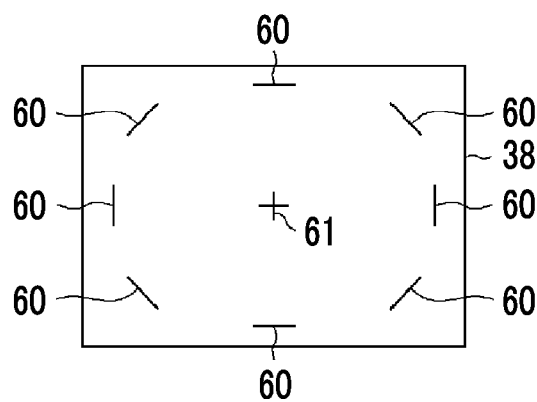
FIGS. 16A and 16B are diagrams illustrating yet still another example of the imaging guide in the display unit.
Figure 16B:
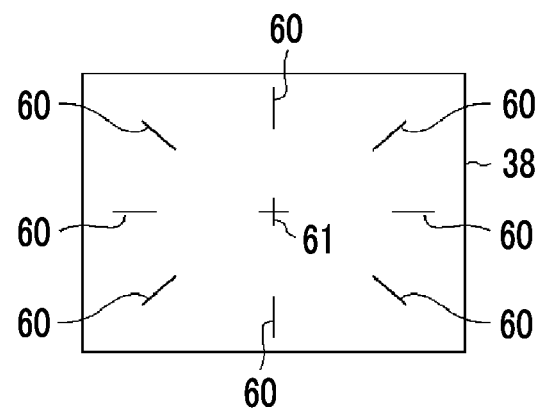

FIGS. 16A and 16B are diagrams illustrating still yet another example of the imaging guide in the display unit 38. As illustrated in FIGS. 16A and 16B, the guide portions 60 may be disposed at positions other than four corners of the display unit 38. The arrangement aspect of the guide portions 60 in the display unit 38 is not particularly limited.

The comparison between the guide display pattern illustrated in FIG. 16A and the guide display pattern illustrated in FIG. 16B illustrates that each guide portion 60 is rotated 90° between the two guide display patterns. That is, the guide portions 60 illustrated in FIG. 16A have a linear shape along the tangential direction in the captured image and the guide portions 60 illustrated in FIG. 16B have a linear shape along the sagittal direction in the captured image. As such, the guide portions 60 may be disposed in the sagittal direction, as well as in the tangential direction.

The "first criterion" may be based on the viewpoint of determining whether captured image data suitable for being compared with the frequency characteristic data of the image data captured and acquired using the first optical system, which is stored in the filter storage unit 48, is obtained. For example, the degree of matching between the in-focus state of the captured image data (first image data) related to the first object image captured and acquired using the first optical system, which is stored in the filter storage unit 48, and the in-focus state of the captured image data (second image data) related to the first object image, which is actually captured and acquired using the second optical system, may be used as the "first criterion". Similarly, the degree of matching between the state of the brightness of the captured image data (first image data) related to the first object image captured and acquired using the first optical system, which is stored in the filter storage unit 48, and the state of the brightness of the captured image data (second image data) related to the first object image, which is actually captured and acquired using the second optical system, may be used as the "first criterion". These criteria relate to accuracy when the frequency characteristics of the captured image data obtained using the first optical system and the second optical system are compared to acquire a sharpening filter associated with the second optical system from a plurality of sharpening filters. In particular, in a case in which the frequency characteristic data of the image data that has been captured and acquired using the first optical system is stored in the filter storage unit 48 in advance, basically, the user does not perform an operation of taking an image to acquire comparative "image data captured using the first optical system". Therefore, the imaging guide based on the first criterion is very useful from the viewpoint of acquiring the sharpening filter associated with the second optical system from the plurality of sharpening filters with high accuracy.

In this way, the user can appropriately acquire the second image data related to the first object image, using the "lens unit 12 (second optical system) that is not capable of appropriately transmitting and receiving imaging information between the lens unit controller 20 and the body controller 28", according to the guidance of the guide portion 60 on the display unit 38.

Then, the frequency characteristic data of the captured and acquired second image data are compared with the frequency characteristic data of the captured image data (first image data) which is read and acquired from the filter storage unit 48 (storage unit) and a sharpening filter associated with the "lens unit 12 (second optical system) that is not capable of appropriately acquiring the imaging conditions" is acquired by the same method as that in the first embodiment. That is, the frequency analysis unit 40 (see FIG. 3) acquires data in the frequency domain of the second image data which has been captured and acquired in this way and the optical characteristic acquisition unit 42 acquires the "frequency characteristic data d related to the optical characteristics of the second optical system". Then, the filter acquisition unit 44 acquires the sharpening filter associated with the "lens unit 12 (second optical system) that is not capable of appropriately acquiring the imaging conditions" from a plurality of sharpening filters for each imaging condition, which are associated with the "lens unit 12 (first optical system) that can appropriately transmit and receive imaging information between the lens unit controller 20 and the body controller 28" and are stored in the filter storage unit 48 in advance, on the basis of the "frequency characteristic data d of the optical characteristics of the second optical system". Then, the filter processing unit 46 stores the "sharpening filter associated with the lens unit 12 (second optical system) that is not capable of appropriately acquiring the imaging conditions" acquired by the filter acquisition unit 44 and uses the sharpening filter when performing a sharpening process for the image data captured and acquired using the "lens unit 12 (second optical system) that is not capable of appropriately acquiring the imaging conditions".

As described above, according to this embodiment, since a series of imaging processes using the "lens unit 12 (second optical system) that is not capable of appropriately acquiring the imaging conditions" is guided by the guide portion 60, the user can appropriately acquire data of the first object image. Therefore, it is possible to omit a process of acquiring the image data captured using the "lens unit 12 (first optical system) that can appropriately acquire imaging conditions" and it is possible to acquire the sharpening filter associated with the "lens unit 12 (second optical system) that is not capable of appropriately acquiring the imaging conditions" with high accuracy, using the comparison with the optical characteristics data of the "lens unit 12 (first optical system) that can appropriately acquire imaging conditions" which is stored in advance.

Third Embodiment

In this embodiment, the detailed description of the same or similar structures and operations as those in the first embodiment will not be repeated.

In this embodiment, the second image data used to acquire the sharpening filter associated with the "lens unit 12 (second optical system) that is not capable of appropriately acquiring the imaging conditions" is selected from a plurality of second image data items.

Figure 17:
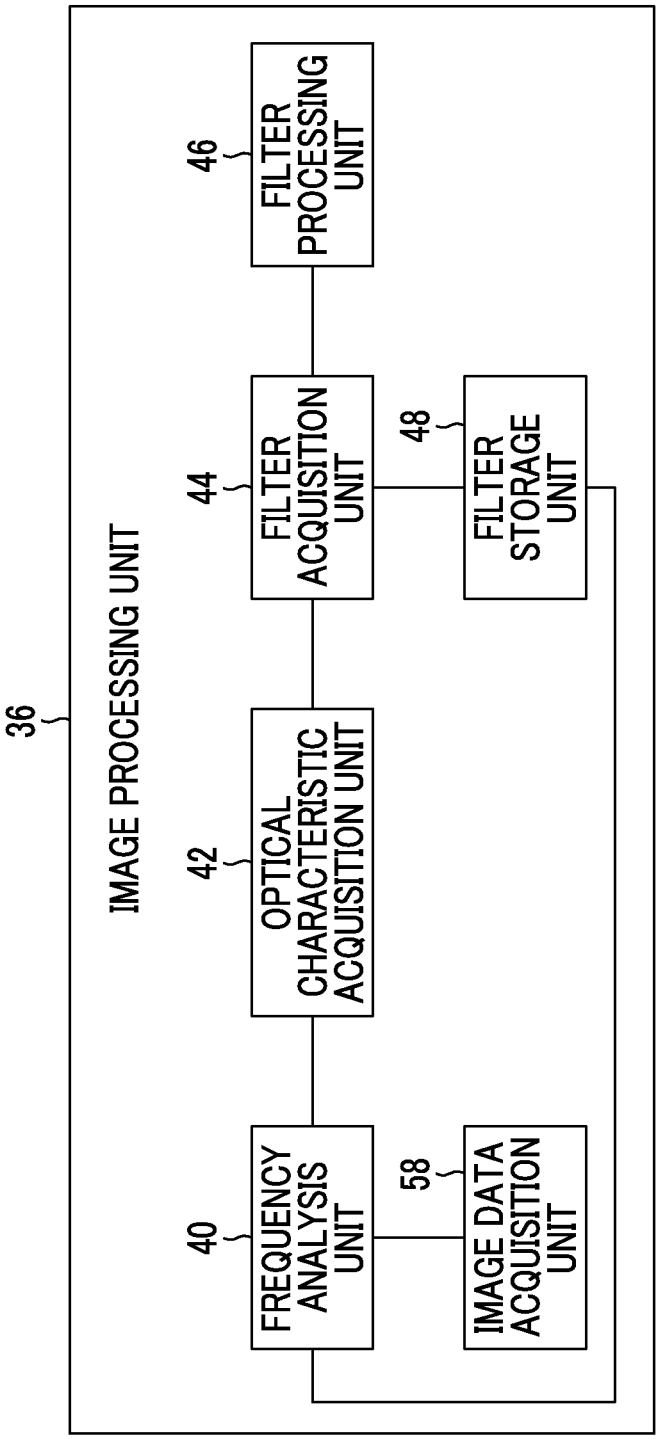
FIG. 17 is a block diagram illustrating an example of the functional structure of an image processing unit according to a third embodiment.

FIG. 17 is a block diagram illustrating an example of the functional structure of an image processing unit 36 according to the third embodiment. In this embodiment, the image processing unit 36 includes an image data acquisition unit 58 in addition to the frequency analysis unit 40, the optical characteristic acquisition unit 42, the filter acquisition unit 44, the filter processing unit 46, and the filter storage unit 48.

The image data acquisition unit 58 acquires evaluation data for a plurality of second image data items acquired by capturing an object image using the "lens unit 12 (second optical system) that is not capable of appropriately acquiring the imaging conditions". Then, the image data acquisition unit 58 acquires "second image data in which data in the frequency domain is acquired by the frequency analysis unit 40" from the plurality of second image data items on the basis of the evaluation data.

The plurality of second image data items, the evaluation data for which is acquired by the image data acquisition unit 58, are acquired under different conditions. For example, exposure conditions are different. A method for achieving the difference between the exposure conditions is not particularly limited. For example, the brightness of one image data item may be adjusted by image processing, such as gain control, to acquire a plurality of second image data items with different exposure conditions. In addition, a plurality of second image data items with different exposure conditions may be acquired by continuously performing an image operation while adjusting a F number (variable according to the position of the diaphragm 17) and/or a shutter speed.

The evaluation data acquired by the image data acquisition unit 58 is compared with the "first image data acquired by capturing an object image using the first optical system" by the optical characteristic acquisition unit 42 to select the second image data used to acquire the sharpening filter associated with the "lens unit 12 (second optical system) that is not capable of appropriately acquiring the imaging conditions". Therefore, for example, the evaluation data may be acquired on the basis of the frequency characteristics of each of the plurality of second image data items.

For example, the image data acquisition unit 58 can acquire the "second image data in which data in the frequency domain is acquired by the frequency analysis unit 40" from the plurality of second image data items on the basis of the number of components of the plurality of second image data items in a specific frequency range. Specifically, the image data acquisition unit 58 may acquire second image data having the largest number of components in a specific frequency range as the "second image data in which data in the frequency domain is acquired by the frequency analysis unit 40" from the plurality of second image data items. Here, the "specific frequency range" is not particularly limited and is preferably a range which is relatively greatly affected by the sharpening process. For example, the "specific frequency range" is included in a range that is equal to or greater than one eighth of the sampling frequency of each of the plurality of second image data items and is equal to or less than one fourth of the sampling frequency.

In each of the following modes, a detailed method for acquiring a single second image data item or a plurality of second image data items acquired by capturing an object image using the "lens unit 12 (second optical system) that is not capable of appropriately acquiring the imaging conditions" is not particularly limited. For example, as in the second embodiment, the body controller 28 (the display control unit 37, the image determination unit 56, and the image data acquisition unit 58 (see FIG. 13)) may display the guide portion 60 (see FIGS. 9A to 12D and FIGS. 14A to 16B) on the display unit 38 to guide the user such that a process of capturing and acquiring a plurality of second image data items is performed.

In this case, the filter storage unit 48 (storage unit) may store data in the frequency domain of the image data (first image data) acquired by capturing an object image using the "lens unit 12 (first optical system) that can appropriately transmit and receive imaging information between the lens unit controller 20 and the body controller 28". For example, an object image (first object image), such as a predetermined chart, may be captured a plurality of number of times, using the "lens unit 12 (first optical system) that can appropriately transmit and receive imaging information between the lens unit controller 20 and the body controller 28", while the imaging conditions are changed, the frequency characteristic data of the captured image data (first image data) obtained for each imaging condition may be stored in the filter storage unit 48 in advance, and the sharpening filters associated with the "lens unit 12 (first optical system)" may be stored in the filter storage unit 48 in advance so as to be associated with each imaging condition. In a case in which the "lens unit 12 (second optical system) that is not capable of appropriately transmitting and receiving imaging information between the lens unit controller 20 and the body controller 28" is mounted on the camera body 14, guidance that prompts the user to take the first object image is performed such that the image data of the first object image captured by an imaging operation using the "lens unit 12 (second optical system)" is acquired.

Then, the frequency analysis unit 40 acquires data (frequency characteristic data) in the frequency domain of the first image data related to the object image (first object image) from the filter storage unit 48 (storage unit) and acquires data in the frequency domain of the second image data using a process of capturing the object image (first object image) using the second optical system and the imaging element 26 (see FIG. 1). Then, the optical characteristic acquisition unit 42 compares the "image data captured using the lens unit 12 (first optical system) that can appropriately acquire the imaging conditions" and the "image data captured using the lens unit 12 (second optical system) that is not capable of appropriately acquiring the imaging conditions" which are related to the same "first object image". A difference in optical characteristics between the lens unit 12 (first optical system) and the lens unit 12 (second optical system) is inferred by the optical characteristic acquisition unit 42. The filter acquisition unit 44 acquires a sharpening filter associated with the "lens unit 12 (second optical system) that is not capable of appropriately acquiring the imaging conditions" from the sharpening filters associated with the "lens unit 12 (first optical system)

that can appropriately acquire the imaging conditions" on the basis of the inference result.

Therefore, in each of the following modes (in particular, a first mode and a third mode), the image processing unit 36 may be provided in apparatuses (for example, the computer 80 (computer controller 82) and the server 85 (server controller 87)) other than the digital camera 10 (body controller 28). In a case in which the image processing unit 36 is provided in apparatuses other than the digital camera 10, image data for acquiring the sharpening filter is transmitted from the digital camera 10 to the image processing unit 36. That is, for example, when the computer 80 performs a process in each of the following modes (in particular, the first mode and the third mode), the digital camera 10 transmits "image data (a plurality of second image data items) used to acquire the sharpening filter" to, for example, the computer 80, in addition to "general image data for viewing". Then, the sharpening filter associated with the "lens unit 12 (second optical system) that is not capable of appropriately acquiring the imaging conditions" is acquired from the "image data (a plurality of second image data items) used to acquire the sharpening filter" and it is possible to perform the sharpening process for the captured image data (general image data for viewing) acquired by the "lens unit 12 (second optical system) that is not capable of appropriately acquiring the imaging conditions", using the sharpening filter.

In this case, the user takes images to acquire "image data (a plurality of second image data items) used to acquire the sharpening filter" and "general image data for viewing", using the digital camera 10 in which the "lens unit 12 (second optical system) that is not capable of appropriately acquiring the imaging conditions" is mounted on the camera body 14, and stores the acquired data in the image storage unit 29 of the digital camera 10. Then, the "image data (a plurality of second image data items) used to acquire the sharpening filter" and the "general image data for viewing" are transmitted from the image storage unit 29 to, for example, the computer 80 and the image processing unit 36 provided in, for example, the computer 80, which is a transmission destination, performs processes in each mode.

The "plurality of second image data items used to acquire the sharpening filter" are captured image data items related to the same object image. In particular, captured image data related to the same object image as the object image of the first image data related to the "lens unit 12 (first optical system) that can appropriately transmit and receive imaging information between the lens unit controller 20 and the body controller 28" is the "plurality of second image data items used to acquire the sharpening filter". That is, the user takes the same object image as the first image data to acquire "a plurality of second image data items" and optimal image data used for a "process of acquiring the sharpening filter related to the lens unit 12 (second optical system) that is not capable of appropriately acquiring the imaging conditions" is selected from the "plurality of second image data items". In particular, in the "structure in which the frequency characteristic data of the first image data is stored in advance", the user does not obtain information about what imaging conditions the stored "first image data" has been acquired. Therefore, the structure in which a plurality of captured image data items (second image data items) for the same object image are acquired and the optimal image data is automatically selected from the plurality of captured image data items (second image data items) is generally useful.

<First Mode>

Figure 18:
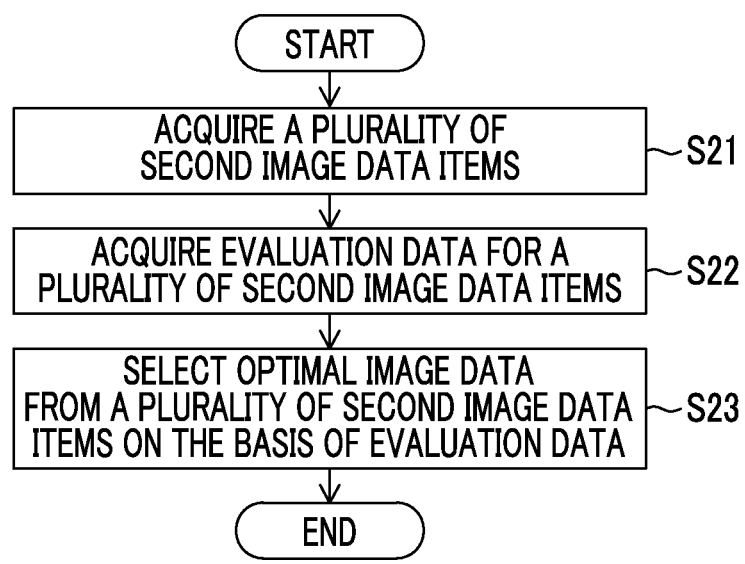
FIG. 18 is a flowchart illustrating an example of the process of an image data acquisition unit in a first mode in the third embodiment.

FIG. 18 is a flowchart illustrating an example of the process of an image data acquisition unit 58 according to a first mode of the third embodiment.

In this mode, a plurality of second image data items are captured and acquired under the same imaging conditions (in particular, a "F number" and a "focal length") except for an "angle of view" and the plurality of second image data items are evaluated to select optimal image data.

That is, in this mode, the user takes images to acquire a plurality of image data items (second image data items), using the digital camera 10 in which the "lens unit 12 (second optical system) that is not capable of appropriately acquiring the imaging conditions" is mounted on the camera body 14, without changing, for example, the "F number" and the "focal length". Then, second image data with an angle of view that is close to the angle of view of the first image data used for the "process of acquiring the sharpening filter associated with the lens unit 12 (second optical system) that is not capable of appropriately acquiring the imaging conditions" is selected from the plurality of image data items (second image data items). Here, the plurality of image data items (second image data items) and the first image data used for the "process of acquiring the sharpening filter associated with the lens unit 12 (second optical system) that is not capable of appropriately acquiring the imaging conditions" are related to the same object image. In a case in which the lens unit 12 is interchangeable, in some cases, it is difficult to set the angle of view of the first image data and the angle of view of the second image data to the same value due to, for example, a difference in magnification between the first optical system and the second optical system. In this case, the structure in which the second image data with an angle of view that is most suitable for the "process of acquiring the sharpening filter associated with the lens unit 12 (second optical system) that is not capable of appropriately acquiring the imaging conditions" is acquired from a plurality of second image data items as in this mode is useful for the user.

In this mode, in a case in which the image processing unit 36 is provided in the body controller 28 of the digital camera 10, a process flow is the same as that in a case in which the image processing unit 36 is provided in apparatuses (for example, the computer 80 (computer controller 82) and the server 85 (server controller 87)) other than the digital camera 10 (body controller 28).

First, the image data acquisition unit 58 acquires a plurality of second image data items (S21 in FIG. 18).

Then, the image data acquisition unit 58 acquires evaluation data for the plurality of second image data items (S22). In this mode, data indicating the number of components of each second image data item in the range that is equal to or greater than one eighth of the sampling frequency of the second image data and is equal to or less than one fourth of the sampling frequency is used as the evaluation data and the image data acquisition unit 58 acquires the evaluation data for each second image data item, using a process using, for example, fast Fourier transform.

Then, the image data acquisition unit 58 acquires image data, which is suitable for being compared with the first image data by the optical characteristic acquisition unit 42, from the plurality of second image data items on the basis of the evaluation data (S23). In this mode, second image data with the largest number of components in the range that is equal to or greater than one eighth of the sampling frequency of the second image data and is equal to or less than one fourth of the sampling frequency is selected as the "image data suitable for comparison" and is transmitted to the frequency analysis unit 40. The "image data suitable for comparison" is selected on the basis of "the largest number of components" in the range that is relatively greatly affected by the sharpening process (for example, the range that is equal to or greater than one eighth of the sampling frequency of the second image data and is equal to or less than one fourth of the sampling frequency). Therefore, the second image data with the maximum output in a correction band intended in the sharpening process is used and it is easy to compare the second image data with the first image data.

Then, the same process as that in the first embodiment is performed (see S11 to S18 in FIG. 8).

<Second Mode>

In this mode, a plurality of second image data items are captured and acquired while the imaging conditions (in particular, the "F number" and the "focal length") except for the "angle of view" are changed, and the plurality of second image data items are evaluated to select optimal image data. Therefore, when taking images to acquire "a plurality of second image data items", the user basically takes images to acquire the plurality of second image data items, without changing the "angle of view", while changing the other imaging conditions (in particular, the "F number" and the "focal length").

For example, in a case in which a plurality of second image data items are captured and acquired while the F number as the "imaging condition" is changed, exposure varies depending on the F number. Therefore, it is necessary to avoid second image data with inappropriate exposure as the image data used for the "process of acquiring the sharpening filter associated with the lens unit 12 (second optical system) that is not capable of appropriately acquiring the imaging conditions" and to select second image data with appropriate exposure. This mode relates to a process of acquiring second image data which is appropriate as the image data used for the "process of acquiring the sharpening filter associated with the lens unit 12 (second optical system) that is not capable of appropriately acquiring the imaging conditions".

Figure 19:
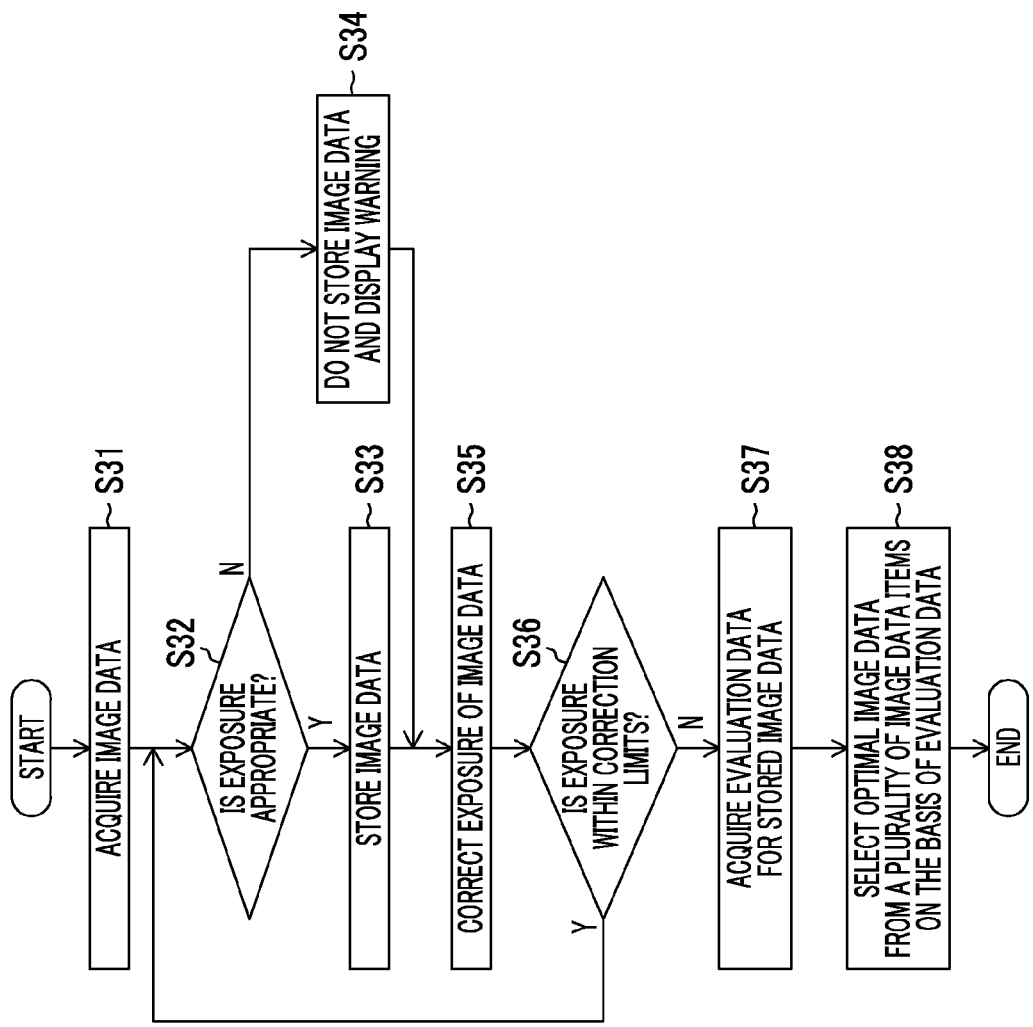
FIG. 19 is a flowchart illustrating an example of the process of the image data acquisition unit in a second mode in the third embodiment.

FIG. 19 is a flowchart illustrating an example of the process of an image data acquisition unit 58 according to the second mode of the third embodiment.

In this mode, the image processing unit 36 is provided in the body controller 28 of the digital camera 10.

First, the image data acquisition unit 58 acquires one second image data item (S31 in FIG. 19).

Then, the image data acquisition unit 58 determines whether the exposure of the one second image data item is appropriate (S32). A method for determining whether the exposure is appropriate is not particularly limited. For example, the following method may be used. The image data acquisition unit 58 determines the brightness of the entire image corresponding to the one second image data item, which is a target, and compares an index value indicating the brightness with a threshold value. In a case in which the brightness is too low or too high, the image data acquisition unit 58 determines that the "exposure is inappropriate". In the other cases, the image data acquisition unit 58 determines that the "exposure is appropriate".

In a case in which the exposure of the second image data is determined to be appropriate (Y in S32), the second image data is stored in a memory (not illustrated) that is provided inside or outside the image data acquisition unit 58 (S33). On the other hand, in a case in which the exposure of the second image data is determined to be inappropriate (N in S32), the second image data is not stored and the image data acquisition unit 58 transmits an instruction signal to the display control unit 37. When receiving the instruction signal from the image data acquisition unit 58, the display control unit 37 displays a warning indicating that the exposure is inappropriate on the display unit 38 (S34).

Then, the image data acquisition unit 58 corrects the exposure of the second image data (S35). A method for correcting the exposure of the second image data is not particularly limited. For example, the image data acquisition unit 58 may correct the exposure of the second image data in the range of ±1 EV or ±2 EV, using gain control. In addition, the image data acquisition unit 58 may capture second image data again while changing the shutter speed to correct the exposure of the second image data.

Then, the image data acquisition unit 58 determines whether the amount of correction of the exposure of the second image data is within the limits (S36). A method for determining whether the amount of correction of the exposure of the second image data is within the limits is not particularly limited.

In a case in which the amount of correction of the exposure of the second image data is determined to be within the limits (Y in S36), Steps S32 to S35 are repeated. On the other hand, in a case in which the amount of correction of the exposure of the second image data is determined not to be within the limits (N in S36), the image data acquisition unit 58 acquires evaluation data for a plurality of second image data items with different exposure conditions which have been stored in the memory (not illustrated) (S37). Then, the image data acquisition unit 58 acquires image data, which is suitable for being compared with the first image data by the frequency analysis unit 40, from the plurality of second image data items, on the basis of the evaluation data (S38).

In this mode, a method for "acquiring the evaluation data (S37)" and "acquiring the image data suitable for comparison (S38)" is the same as that in the first mode.

Then, the same process as that in the first embodiment is performed (see S11 to S18 in FIG. 8).

<Third Mode>

In this mode, a plurality of second image data items are captured and acquired while the imaging conditions (in particular, the "F number" and the "focal length") except for the "angle of view" are changed and the plurality of second image data items are evaluated to select optimal image data. Therefore, when taking images to acquire "a plurality of second image data items", basically, the user takes images to acquire a plurality of second image data items while changing the imaging conditions (in particular, the "F number" and the "focal length") except for the "angle of view".

For example, in a case in which a plurality of second image data items are captured and acquired while the F number as the "imaging condition" is changed, exposure varies depending on the F number. Therefore, it is necessary to avoid second image data with inappropriate exposure as the image data used for the "process of acquiring the sharpening filter associated with the lens unit 12 (second optical system) that is not capable of appropriately acquiring the imaging conditions" and to select second image data with appropriate exposure. This mode relates to a process of acquiring second image data which is appropriate as the image data used for the "process of acquiring the sharpening filter associated with the lens unit 12 (second optical system) that is not capable of appropriately acquiring the imaging conditions".

Figure 20:
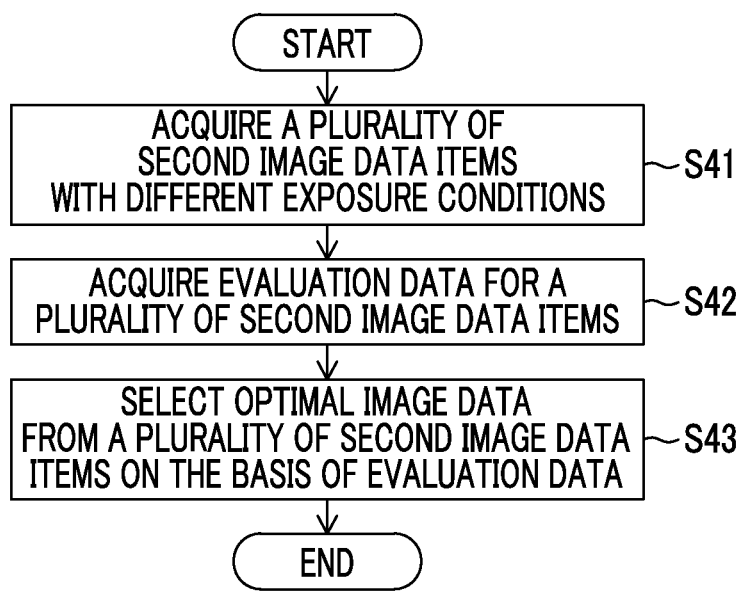
FIG. 20 is a flowchart illustrating an example of the process of the image data acquisition unit in a third mode in the third embodiment.

FIG. 20 is a flowchart illustrating an example of the process of an image data acquisition unit 58 according to the third mode of the third embodiment.

In this mode, the image processing unit 36 can be provided in apparatuses (for example, the computer 80 (computer controller 82) and the server 85 (server controller 87)) other than the digital camera 10 (body controller 28). Next, for example, a case in which the image processing unit 36 is provided in the computer controller 82 (see FIG. 1) will be described.

First, the user acquires a plurality of second image data items while changing exposure conditions and the plurality of second image data items are stored in the image storage unit 29 provided in the digital camera 10 (camera body 14). Then, the image data acquisition unit 58 of the computer controller 82 acquires the "plurality of second image data items acquired under different exposure conditions" stored in the image storage unit 29 (S41 in FIG. 20).

Then, the image data acquisition unit 58 acquires evaluation data for the plurality of second image data items (S42) and acquires image data, which is suitable for being compared with the first image data by the frequency analysis unit 40, from the plurality of second image data items, on the basis of the evaluation data (S43). In this mode, a method for "acquiring the evaluation data (S42)" and "acquiring the image data suitable for comparison (S43)" is the same as that in the first mode.

Then, the same process as that in the first embodiment is performed (see S11 to S18 in FIG. 8).

Other Modification Examples

Among the above-described embodiments and modification examples, arbitrary embodiments and modification examples may be combined with each other. The above-described embodiments are illustrative and the invention may be applied to other structures.

In the above-described embodiments, the sharpening filter is specified on the basis of the information of the F number and the focal length. However, the sharpening filter may be specified on the basis of other imaging conditions (for example, an object distance and brightness (exposure, a histogram, and the degree of saturation)). In this case, the same operation and effect as described above can be obtained.

Each of the above-mentioned functional structures can be implemented by arbitrary hardware, software, or a combination thereof. For example, the invention can be applied to a program that causes a computer to perform an image processing method (image processing procedure) in each of the above-mentioned apparatuses and the processing units (for example, the image processing unit 36), a computer-readable storage medium (non-transitory storage medium) storing the program, or a computer in which the program can be installed.

<Application Example to EDoF System>

The sharpening process according to the above-described embodiments includes a restoration process considering an optical transfer function. The restoration process is image processing for recovering and correcting point spread (point image blur) according to information about specific imaging conditions (for example, a F number, a focal length, a lens type, and a zoom magnification) to restore the original object image. The sharpening process to which the invention can be applied is not limited to the restoration process in the above-described embodiments. For example, the restoration process according to the invention can also be applied to a restoration process for image data which has been captured and acquired by an optical system (for example, an imaging lens) having an extended depth of field ((focus) (EDoF)).

The restoration process is performed for the image data of a blurred image which is captured and acquired by the EDoF optical system in a state in which the depth of field (depth of focus) is extended to restore and generate high-resolution image data which is in focus in a wide range. In this case, the restoration process is performed using a restoration filter which is based on the optical transfer function (for example, PSF, OTF, MTF, or PTF) of the EDoF optical system and which has a filter coefficient set such that satisfactory image restoration can be performed within the range of the extended depth of field (depth of focus).

Hereinafter, an example of a system (EDoF system) related to the restoration of the image data which is captured and acquired by the EDoF optical system will be described. In the following example, the restoration process is performed for a brightness signal (Y data) obtained from the image data (RGB data) after a demosaicing process. The time when the restoration process is performed is not particularly limited. For example, the restoration process may be performed for "image data (mosaic image data) before the demosaicing process" or "image data (demosaic image data) after the demosaicing process and before a brightness signal conversion process".

Figure 21:
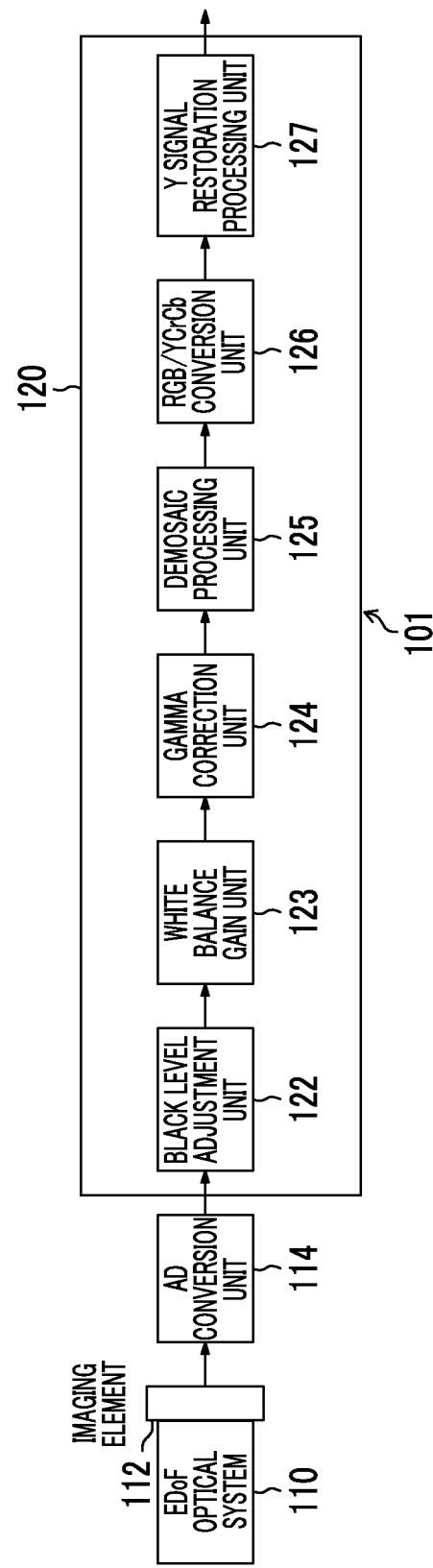
FIG. 21 is a block diagram illustrating an example of an imaging module comprising an EDoF optical system.

FIG. 21 is a block diagram illustrating an example of an imaging module 101 comprising the EDoF optical system. The imaging module 101 (for example, a digital camera) according to this example includes an EDoF optical system (lens unit) 110, an imaging element 112, an AD conversion unit 114, and a restoration processing block (the image processing unit 36) 120.

Figure 22:
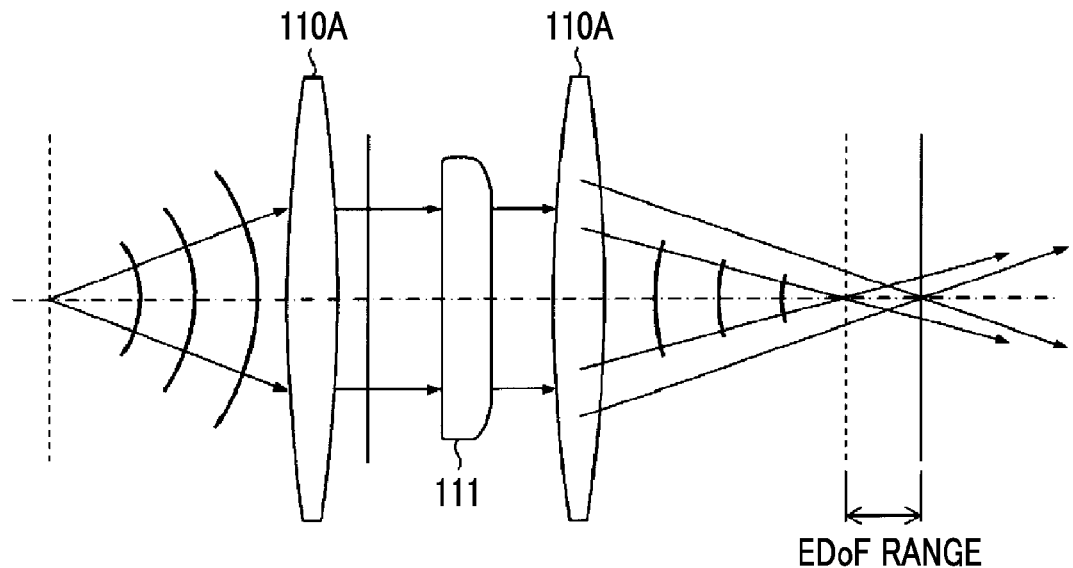
FIG. 22 is a diagram illustrating an example of the EDoF optical system.

FIG. 22 is a diagram illustrating an example of the EDoF optical system 110. The EDoF optical system 110 according to this example includes fixed single-focus imaging lenses 110A and an optical filter 111 which is disposed at a pupil position. The optical filter 111 modulates a phase to make the EDoF optical system 110 (photographing lens 110A) have the extended depth of field such that the extended depth of field (the extended depth of focus) (EDoF) is obtained. As such, the imaging lenses 110A and the optical filter 111 form a lens unit which modulates the phase to extend the depth of field.

The EDoF optical system 110 includes other components, if necessary. For example, a diaphragm (not illustrated) is provided in the vicinity of the optical filter 111. The optical filter 111 may be one filter or may be a combination of a plurality of filters. The optical filter 111 is an example of optical phase modulation means and the EDoF of the EDoF optical system 110 (imaging lens 110A) may be achieved by other means. For example, the EDoF of the EDoF optical system 110 may be achieved by the imaging lens 110A that is designed to have the same function as the optical filter 111 according to this example, instead of the optical filter 111.

That is, the EDoF of the EDoF optical system 110 can be achieved by various means for changing the wavefront of light focused on a light receiving surface of the imaging element 112. For example, "an optical element with a variable thickness", "an optical element with a variable refractive index (for example, a refractive-index-distribution-type wavefront modulation lens)", "an optical element of which the thickness or refractive index varies due to, for example, a coated lens surface (for example, a wavefront modulation hybrid lens or an optical element formed on a lens surface as a phase plane)", or "a liquid crystal element capable of modulating a phase distribution of light (for example, a liquid crystal spatial phase modulation element)" may be used as EDoF means of the EDoF optical system 110. As such, the invention can be applied to not only a case in which an image which is regularly dispersed by an optical wavefront modulation element (the optical filter 111 (phase plate)) can be formed but also a case in which the same dispersed image as that obtained by the optical wavefront modulation element can be formed by the imaging lens 110A, without using the optical wavefront modulation element.

The EDoF optical system 110 illustrated in FIG. 22 can be reduced in size since a focus adjustment mechanism which mechanically adjusts the focus can be omitted, and can be preferably provided in a mobile phone or a portable information terminal with a camera.

An optical image which has passed through the EDoF optical system 110 having the EDoF is formed on the imaging element 112 illustrated in FIG. 21 and is converted into an electric signal.

The imaging element 112 includes a plurality of pixels which are arranged in a matrix using a predetermined pattern array (for example, a Bayer array, a G stripe R/G full checkered pattern, an X-Trans array, or a honeycomb array). Each pixel includes a microlens, a color filter (in this example, RGB color filters), and a photodiode. An optical image which is incident on the light receiving surface of the imaging element 112 through the EDoF optical system 110 is converted into a signal charge corresponding to the amount of incident light by each photodiode arranged on the light receiving surface. The R, G, and B signal charges accumulated in each photodiode are sequentially output as voltage signals (image signals) for each pixel.

The AD conversion unit 114 converts the analog R, G, and B image signals for each pixel which are output from the imaging element 112 into digital R, G, and B image signals. The digital image signals converted by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 performs black level adjustment for the digital image signals output from the AD conversion unit 114. A known method may be used for the black level adjustment. For example, in a case in which attention is focused on a certain effective photoelectric conversion element, the average of dark current acquisition signals corresponding to each of a plurality of OB photoelectric conversion elements which are included in a photoelectric conversion element row including the effective photoelectric conversion element is calculated and the average is subtracted from the dark current acquisition signals corresponding to the effective photoelectric conversion element to perform the black level adjustment.

The white balance gain unit 123 performs gain adjustment according to the white balance gain of each of the R, G, and B signals included in the digital image signals of which the black level data has been adjusted.

The gamma processing unit 124 performs gamma correction for correcting gradation, such as halftone, such that the R, G, and B image signals subjected to the white balance adjustment have desired gamma characteristics.

The demosaic processing unit 125 performs a demosaicing process for the R, G, and B image signals subjected to the gamma correction. Specifically, the demosaic processing unit 125 performs a color interpolation process for the R, G, and B image signals to generate a set of image signals (an R signal, a G signal, and a B signal) output from each light receiving pixel of the imaging element 112. That is, while a pixel signal output from each light receiving pixel is any one of the R, G, and B image signals before a color demosaicing process, a set of three pixel signals, which are R, G, and B signals corresponding to each light receiving pixel, is output after the color demosaicing process.

The RGB/YCrCb conversion unit 126 converts the R, G, and B signals for each pixel which have been subjected to the demosaicing process into a brightness signal Y and color difference signals Cr and Cb and outputs the brightness signal Y and the color difference signals Cr and Cb of each pixel.

The Y signal restoration processing unit 127 performs a restoration process for the brightness signal Y output from the RGB/YCrCb conversion unit 126 on the basis of a restoration filter which is stored in advance. The restoration filter includes, for example, a deconvolution kernel (corresponding to the number of taps of M=7 and N=7) having a kernel size of 7×7 and a calculation coefficient (corresponding to restoration gain data and a filter coefficient) corresponding to the deconvolution kernel and is used for a deconvolution process (reverse convolution process) corresponding to the phase modulation of the optical filter 111. The restoration filter corresponding to the optical filter 111 is stored in a memory (not illustrated) (for example, a memory in which the Y signal restoration processing unit 127 is incidentally provided). The size of the deconvolution kernel is not limited to 7×7. In addition, the Y signal restoration processing unit 127 has the function of the sharpening process of the image processing unit 36.

Figure 23:
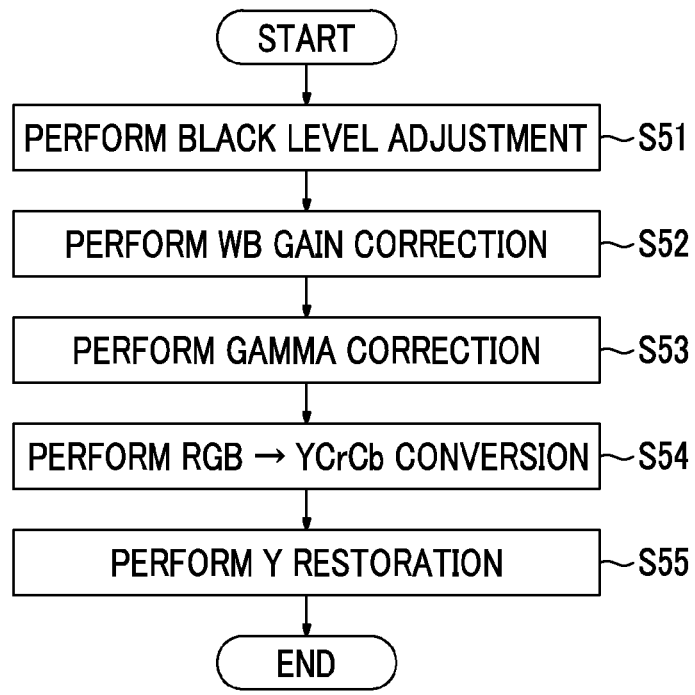
FIG. 23 is a diagram illustrating an example of the flow of a restoration process by a restoration processing block illustrated in FIG. 21.

Next, the restoration process of the restoration processing block 120 will be described. FIG. 23 is a diagram illustrating an example of the flow of the restoration process performed by the restoration processing block 120 illustrated in FIG. 21.

The digital image signal is applied from the AD conversion unit 114 to one input of the black level adjustment unit 122 and black level data is applied to the other input of the black level adjustment unit 122. The black level adjustment unit 122 subtracts the black level data from the digital image signal and outputs the digital image signal, from which the black level data has been subtracted, to the white balance gain unit 123 (Step S51). In this way, no black level components are included in the digital image signal and a digital image signal indicating the black level becomes 0.

The image data subjected to the black level adjustment is sequentially processed by the white balance gain unit 123 and the gamma processing unit 124 (Steps S52 and S53).

The demosaic processing unit 125 performs the demosaicing process for the R, G, and B signals subjected to the gamma correction and the RGB/YCrCb conversion unit 126 converts the R, G, and B signals into the brightness signal Y and the color difference signals Cr and Cb (Step S54).

The Y signal restoration processing unit 127 applies a deconvolution process corresponding to the phase modulation of the optical filter 111 of the EDoF optical system 110 to the brightness signal Y to perform a restoration process (Step S55). That is, the Y signal restoration processing unit 127 performs the deconvolution process (reverse convolution process) for brightness signals (here, brightness signals from 7×7 pixels) corresponding to a predetermined unit pixel group which has an arbitrary pixel to be processed as the center and the restoration filter (the deconvolution kernel having a kernel size of 7×7 and the calculation coefficient thereof) which has been stored in, for example, the memory in advance. The Y signal restoration processing unit 127 repeatedly performs the deconvolution process for each predetermined unit pixel group so as to cover the entire imaging surface, thereby performing a restoration process of removing the blurring of the entire image. The restoration filter is determined according to the position of the center of the pixel group to be subjected to the deconvolution process. That is, a common restoration filter is applied to adjacent pixel groups. In addition, it is preferable to apply a common restoration filter to all pixel groups in order to simplify the restoration process.

Figure 24:
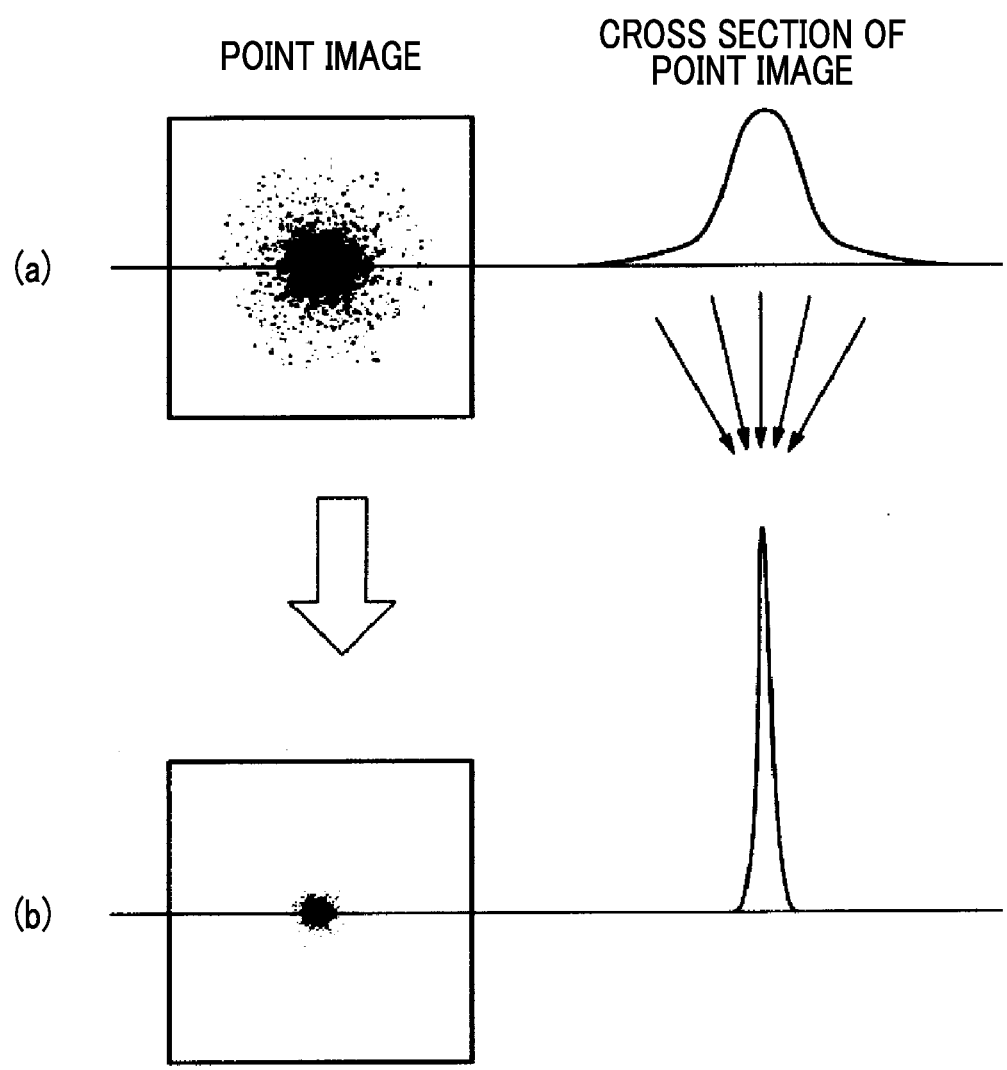
FIG. 24 is a diagram illustrating an example of the restoration of an image acquired through the EDoF optical system. (a) of FIG. 24 illustrates a blurred image before the restoration process and (b) of FIG. 24 illustrates an image (point image) from which blurring is removed after the restoration process.

As illustrated in (a) of FIG. 24, a point image (optical image) of the brightness signal which has passed through the EDoF optical system 110 is formed as a large point image (blurred image) on the imaging element 112. However, the point image is restored to a small point image (high-resolution image) by the deconvolution process of the Y signal restoration processing unit 127, as illustrated in (b) of FIG. 24.

As described above, the restoration process is applied to the brightness signal subjected to the demosaicing process. Therefore, it is not necessary to separately provide the parameters of the restoration process for R, G, and B and it is possible to perform the restoration process at a high speed. Furthermore, the deconvolution process is not performed for one unit of the R, G, and B image signals corresponding to the R, G, and B pixels at discrete positions, but a common restoration filter is applied to a predetermined unit of the brightness signals of adjacent pixels to perform the deconvolution process. Therefore, the accuracy of the restoration process is improved. For the color difference signals Cr and Cb, resolution does not need to be increased by the restoration process in terms of image quality due to the visual characteristic of the human eye. In a case in which an image is recorded in a compression format, such as a JPEG format, the color difference signal is compressed at a higher compression ratio than the brightness signal. Therefore, the necessity to increase resolution using the restoration process is reduced. As a result, it is possible to improve the accuracy of restoration, to simplify the process, and to improve the processing speed.

The point image restoration process according to the above-described embodiments can also be applied to the restoration process of the above-mentioned EDoF system.

An aspect to which the invention can be applied is not limited to the digital camera and the computer (server). The invention can be applied to mobile devices having an imaging function and functions (a calling function, a communication function, and other computer functions) other than the imaging function, in addition to cameras having an imaging function as a main function. For example, mobile phones, smart phones, personal digital assistants (PDAs), and portable game machines having a camera function are given as other aspects to which the invention can be applied. Hereinafter, an example of a smart phone to which the invention can be applied will be described.

<Application Example to Smart Phone>

Figure 25:
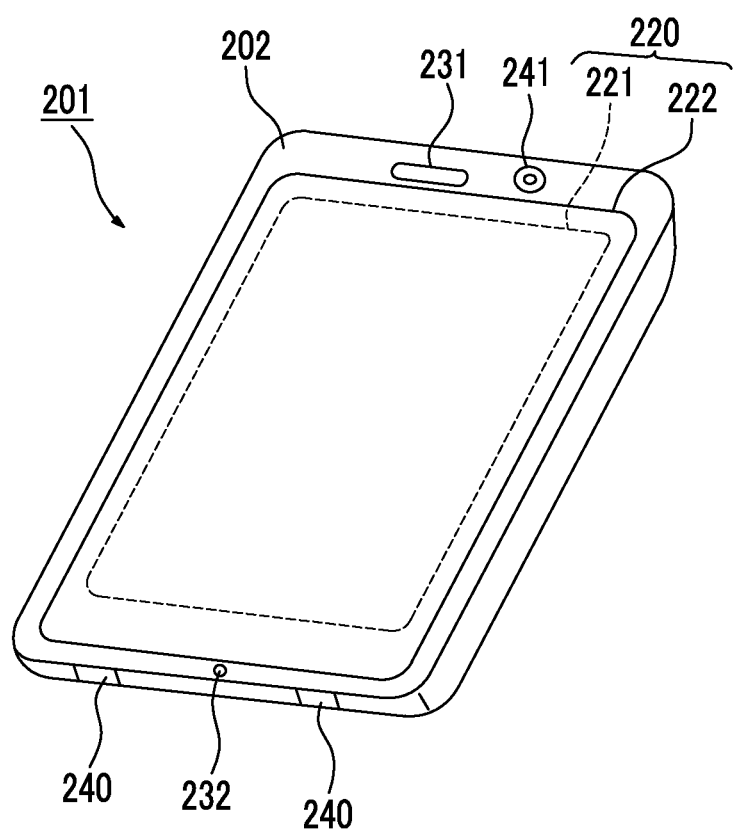
FIG. 25 is a diagram illustrating the outward appearance of a smart phone.

FIG. 25 is a diagram illustrating the outward appearance of a smart phone 201. The smart phone 201 illustrated in FIG. 25 comprises a housing 202 with a flat panel shape and a display input unit 220 having a display panel 221 as a display unit and an operation panel 222 as an input unit which are integrally formed on one surface of the housing 202. The housing 202 comprises a speaker 231, a microphone 232, an operating unit 240, and a camera unit 241. However, the configuration of the housing 202 is not limited thereto. For example, the display unit and the input unit may be independently provided, or the housing 202 may have a folding structure or a sliding structure.

Figure 26:
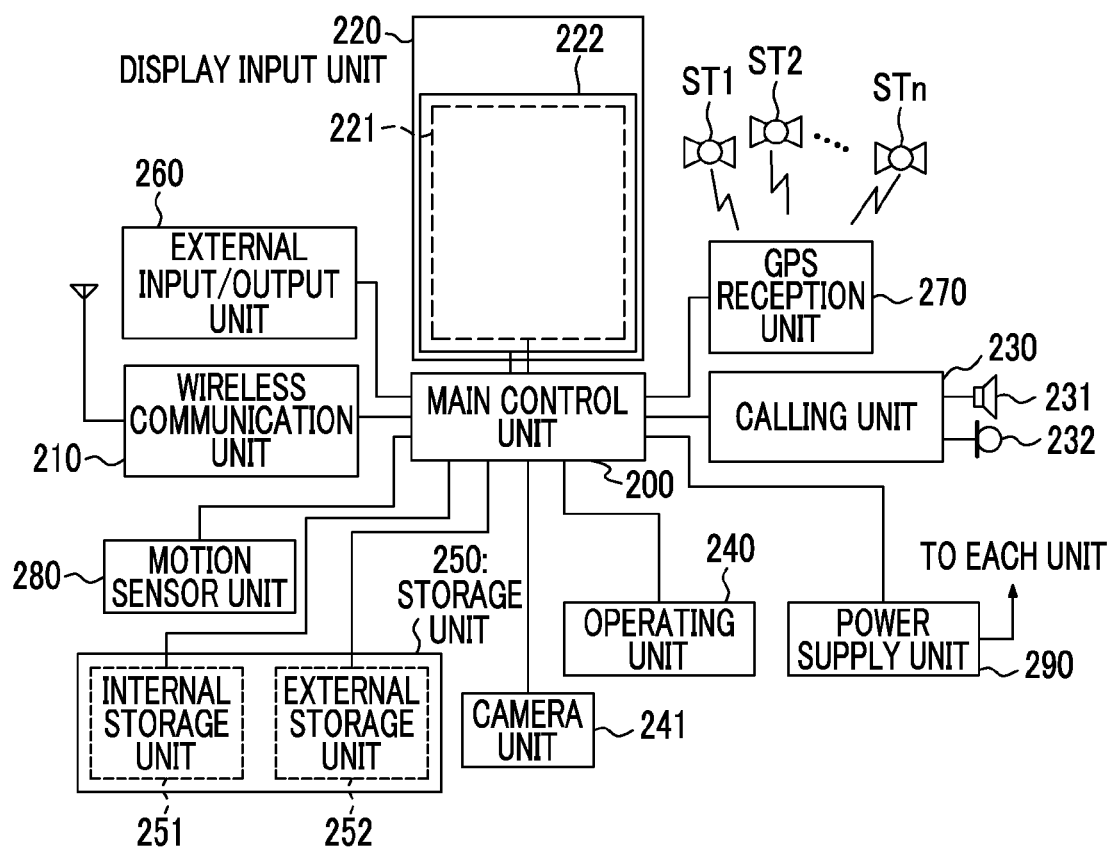
FIG. 26 is a block diagram illustrating the structure of the smart phone illustrated in FIG. 25.

FIG. 26 is a block diagram illustrating the structure of the smart phone 201 illustrated in FIG. 25. As illustrated in FIG. 26, the smart phone comprises, as main components, a wireless communication unit 210, the display input unit 220, a calling unit 230, the operating unit 240, the camera unit 241, a storage unit 250, an external input/output unit 260, a global positioning system (GPS) receiving unit 270, a motion sensor unit 280, a power supply unit 290, and a main control unit 200 (including the body controller 28). The smart phone 201 has, as a main function, a wireless communication function which performs mobile wireless communication through a base station apparatus BS and a mobile communication network NW.

The wireless communication unit 210 performs wireless communication with the base station apparatus BS which is accommodated in the mobile communication network NW in response to an instruction from the main control unit 200. The wireless communication is used to transmit and receive various types of file data, such as voice data and image data, and electronic mail data or to receive, for example, web data and streaming data.

The display input unit 220 is a so-called touch panel that displays, for example, images (still images and moving images) or text information to visually transmit information to the user and detects the user's operation for the displayed information under the control of the main control unit 200 and comprises the display panel 221 and the operation panel 222.

The display panel 221 uses, for example, a liquid crystal display (LCD) or an organic electro-luminescence display (OELD) as a display device. The operation panel 222 is a device that is provided such that an image displayed on a display surface of the display panel 221 is visually recognized and detects one or a plurality of coordinate points operated by a finger of the user or a stylus. When the device is operated by a finger of the user or a stylus, a detection signal which is generated by the operation is output to the main control unit 200. Then, the main control unit 200 detects an operation position (coordinates) on the display panel 221 on the basis of the received detection signal.

As illustrated in FIG. 25, the display panel 221 and the operation panel 222 of the smart phone 201 which is an embodiment of the imaging apparatus according to the invention are integrated to form the display input unit 220 and the operation panel 222 is arranged so as to completely cover the display panel 221. In a case in which this arrangement is used, the operation panel 222 may have a function of detecting the user's operation even in a region other than the display panel 221. In other words, the operation panel 222 may comprise a detection region (hereinafter, referred to as a display region) for an overlap portion which overlaps the display panel 221 and a detection region (hereinafter, referred to as a non-display region) for an outer edge portion which does not overlap the display panel 221.

The size of the display region may be exactly equal to the size of the display panel 221. However, the sizes are not necessarily equal to each other. The operation panel 222 may comprise two sensitive regions, that is, an outer edge portion and an inner portion other than the outer edge portion. The width of the outer edge portion is appropriately designed according to, for example, the size of the housing 202. Examples of a position detecting method which is used in the operation panel 222 include a matrix switching method, a resistive film method, a surface elastic wave method, an infrared method, an electromagnetic induction method, and a capacitive sensing method. Any of the methods may be used.

The calling unit 230 comprises the speaker 231 and the microphone 232. The calling unit 230 converts the voice of the user which is input through the microphone 232 into voice data which can be processed by the main control unit 200 and outputs the converted voice data to the main control unit 200. In addition, the calling unit 230 decodes voice data received by the wireless communication unit 210 or the external input/output unit 260 and outputs the decoded voice data from the speaker 231. As illustrated in FIG. 25, for example, the speaker 231 can be mounted on the same surface as the display input unit 220 and the microphone 232 can be mounted on a side surface of the housing 202.

The operating unit 240 is a hardware key which uses, for example, a key switch and receives instructions from the user. For example, as illustrated in FIG. 25, the operating unit 240 is a push button switch which is mounted on the side surface of the housing 202 of the smart phone 201, is turned on when it is pressed by, for example, a finger, and is turned off by the restoring force of a spring when the finger is taken off.

The storage unit 250 stores a control program or control data of the main control unit 200, application software, address data which is associated with, for example, the names or phone numbers of communication partners, transmitted and received electronic mail data, web data which is downloaded by web browsing, and downloaded content data. In addition, the storage unit 250 temporarily stores, for example, streaming data. The storage unit 250 includes an internal storage unit 251 which is provided in the smart phone and an external storage unit 252 having an external memory slot that is detachable and attachable. The internal storage unit 251 and the external storage unit 252 forming the storage unit 250 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 260 functions as an interface with all of the external apparatuses connected to the smart phone 201 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 201 include a wired/wireless headset, a wired/wireless external charger, a wired/wireless data port, a memory card or a subscriber identity module (SIM)/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit may transmit data which is received from the external apparatus to each component of the smart phone 201 or may transmit data in the smart phone 201 to the external apparatus.

The GPS receiving unit 270 receives GPS signals transmitted from GPS satellites ST1 to STn and performs a position measurement process on the basis of the received GPS signals to detect a position including the latitude, longitude, and height of the smart phone 201, in response to an instruction from the main control unit 200. When the GPS receiving unit 270 can acquire positional information from the wireless communication unit 210 or the external input/output unit 260 (for example, the wireless LAN), the GPS receiving unit 270 can detect the position using the positional information.

The motion sensor unit 280 comprises, for example, a triaxial acceleration sensor and detects the physical movement of the smart phone 201 in response to an instruction from the main control unit 200. When the physical movement of the smart phone 201 is detected, the moving direction or acceleration of the smart phone 201 is detected. The detection result is output to the main control unit 200.

The power supply unit 290 supplies power which is stored in a battery (not illustrated) to each unit of the smart phone 201 in response to an instruction from the main control unit 200.

The main control unit 200 comprises a microprocessor, operates on the basis of the control program or control data stored in the storage unit 250, and controls the overall operation of each unit of the smart phone 201. The main control unit 200 has an application processing function and a mobile communication control function of controlling each unit of a communication system in order to perform voice communication or data communication through the wireless communication unit 210.

The application processing function is implemented by the operation of the main control unit 200 based on the application software which is stored in the storage unit 250. Examples of the application processing function include an infrared communication function which controls the external input/output unit 260 such that data communication with an opposing apparatus is performed, an electronic mail function which transmits and receives electronic mail, and a web browsing function which browses web pages.

The main control unit 200 has, for example, an image processing function which displays an image on the display input unit 220 on the basis of image data (still image data or moving image data) such as received data or downloaded streaming data. The image processing function means the function of the main control unit 200 decoding the image data, performing image processing on the decoding result, and displaying the image on the display input unit 220.

The main control unit 200 performs display control for the display panel 221 and operation detection control for detecting the operation of the user through the operating unit 240 and the operation panel 222.

The main control unit 200 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 221.

The main control unit 200 performs the operation detection control to detect the operation of the user input through the operating unit 240, to receive an operation for the icon or the input of a character string to an input field of the window through the operation panel 222, or to receive a request to scroll the displayed image through the scroll bar.

In addition, the main control unit 200 has a touch panel control function that performs the operation detection control to determine whether the position of an operation for the operation panel 222 is an overlap portion (display region) which overlaps the display panel 221 or an outer edge portion (non-display region) which does not overlap the display panel 221 other than the overlap portion and controls a sensitive region of the operation panel 222 or the display position of the software key.

The main control unit 200 can detect a gesture operation for the operation panel 222 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 241 is a digital camera which captures images using an imaging element such as a complementary metal oxide semiconductor (CMOS) or a charge-coupled device (CCD). In addition, the camera unit 241 can convert captured image data into image data which is compressed in, for example, a Joint Photographic Coding Experts Group (JPEG) format, store the converted image data in the storage unit 250, and output the converted image data through the external input/output unit 260 or the wireless communication unit 210, under the control of the main control unit 200. As illustrated in FIG. 25, the camera unit 241 is mounted on the same surface as the display input unit 220 in the smart phone 201. However, the mounting position of the camera unit 241 is not limited thereto. For example, the camera unit 241 may be mounted on the rear surface of the display input unit 220 or a plurality of camera units 241 may be mounted. In a case in which a plurality of camera units 241 are mounted, the camera units 241 which are used to capture images may be switched such that a single camera unit captures images or the plurality of camera units 241 may be simultaneously used to capture images.

The camera unit 241 can be used for various functions of the smart phone 201. For example, the image acquired by the camera unit 241 can be displayed on the display panel 221 or the image captured by the camera unit 241 can be used as one of the operation inputs of the operation panel 222. When the GPS receiving unit 270 detects the position, the position may be detected with reference to the image from the camera unit 241. In addition, the optical axis direction of the camera unit 241 in the smart phone 201 may be determined or the current usage environment may be determined, with reference to the image from the camera unit 241, using the triaxial acceleration sensor or without using the triaxial acceleration sensor. Of course, the image from the camera unit 241 may be used in the application software.

For example, the positional information which is acquired by the GPS receiving unit 270, the voice information which is acquired by the microphone 232 (for example, the main control unit may convert the voice information into text information), and the posture information which is acquired by the motion sensor unit 280 may be added to the image data of a still image or a moving image and the image data may be stored in the storage unit 250 or may be output through the external input/output unit 260 or the wireless communication unit 210.

The image processing unit 36 may be implemented by, for example, the main control unit 200.

The invention is not limited to the above-described embodiments and various modifications and changes of the invention can be made without departing from the scope and spirit of the invention.

EXPLANATION OF REFERENCES

10: digital camera
12: lens unit
14: camera body
16: lens
17: diaphragm
18: optical system operation unit
20: lens unit controller
22: lens unit input/output unit
26: imaging element
28: body controller
29: image storage unit
30: camera body input/output unit
32: input/output interface
34: device control unit
36: image processing unit
37: display control unit
38: display unit
40: frequency analysis unit
42: optical characteristic acquisition unit
44: filter acquisition unit
46: filter processing unit
48: filter storage unit
49: filter characteristic data
50: sharpening filter
56: image determination unit
58: image data acquisition unit
60: guide portion
61: auto focus area
62: imaging condition display portion
64: determination information portion
80: computer
81: computer input/output unit
82: computer controller
83: display
84: network
85: server
86: server input/output unit
87: server controller
101: imaging module
110: EDoF optical system
110A: imaging lens
111: optical filter
112: imaging element
114: AD conversion unit
120: restoration processing block
122: black level adjustment unit
123: white balance gain unit
124: gamma processing unit
125: demosaic processing unit
126: RGB/YCrCb conversion unit
127: Y signal restoration processing unit
200: main control unit
201: smart phone
202: housing
210: wireless communication unit
220: display input unit
221: display panel
222: operation panel
230: calling unit
231: speaker
232: microphone
240: operating unit
241: camera unit
250: storage unit
251: internal storage unit
252: external storage unit
260: external input/output unit
270: GPS receiving unit
280: motion sensor unit
290: power supply unit

What is claimed is:

1. An image processing device comprising:
a frequency analysis unit that acquires data in a frequency domain of each of first image data which is acquired by capturing an object image using a first optical system and second image data which is acquired by capturing an object image using a second optical system,
wherein the first image data and the second image data are acquired by capturing the same object image;
an optical characteristic acquisition unit that compares the data in the frequency domain of the first image data with the data in the frequency domain of the second image data to acquire frequency characteristic data related to optical characteristics of the second optical system; and
a filter acquisition unit that acquires a sharpening filter associated with the second optical system from a plurality of sharpening filters associated with the first optical system, on the basis of the frequency characteristic data related to the optical characteristics of the second optical system.

2. The image processing device according to claim 1, wherein the filter acquisition unit acquires, as the sharpening filter associated with the second optical system, a sharpening filter which is acquired from the plurality of sharpening filters associated with the first optical system and has frequency characteristics closest to the frequency characteristic data related to the optical characteristics of the second optical system.

3. The image processing device according to claim 1, wherein the optical characteristic acquisition unit acquires the frequency characteristic data related to the optical characteristics of the second optical system on the basis of a ratio of the data in the frequency domain of the first image data to the data in the frequency domain of the second image data.

4. The image processing device according to claim 3, wherein the first image data is not subjected to a sharpening process using a sharpening filter which is acquired from the plurality of sharpening filters associated with the first optical system according to imaging conditions, and
when the data in the frequency domain of the first image data is represented by a, the data in the frequency domain of the second image data is represented by b, and a response indicating a ratio of the first image data after the sharpening filter which is acquired from the plurality of sharpening filters associated with the first optical system according to imaging conditions of the first image data is applied to the first image data before the sharpening filter is applied for each frequency is represented by c, the optical characteristic acquisition unit acquires the frequency characteristic data related to the optical characteristics of the second optical system which is represented by a/b×c.

5. The image processing device according to claim 1, wherein, in a case in which the response of each of the plurality of sharpening filters associated with the first optical system for each frequency is represented by a ratio of the image data after the sharpening filter is applied to the image data before the sharpening filter is applied for each spatial frequency, the filter acquisition unit acquires the sharpening filter associated with the second optical system from the plurality of sharpening filters associated with the first optical system, on the basis of an area surrounded by the frequency characteristic data related to the optical characteristics of the second optical system which is acquired by the optical characteristic acquisition unit and the response of the sharpening filter in a coordinate system in which a horizontal axis indicates the spatial frequency and a vertical axis indicates the response.

6. The image processing device according to claim 5, wherein the filter acquisition unit acquires, as the sharpening filter associated with the second optical system, a sharpening filter which is selected from the plurality of sharpening filters associated with the first optical system and has the smallest area surrounded by the frequency characteristic data related to the optical characteristics of the second optical system which is acquired by the optical characteristic acquisition unit and the response thereof in the coordinate system.

7. The image processing device according to claim 1, further comprising:
a filter processing unit that applies the sharpening filter acquired by the filter acquisition unit to the second image data.

8. The image processing device according to claim 1, wherein the optical characteristics of the second optical system are an optical transfer function of the second optical system.

9. The image processing device according to claim 1, further comprising:
an image data acquisition unit that acquires evaluation data for a plurality of second image data items acquired by capturing an object image using the second optical system and acquires the second image data, in which data in the frequency domain is acquired by the frequency analysis unit, from the plurality of second image data items on the basis of the evaluation data.

10. The image processing device according to claim 9, wherein the plurality of second image data items are acquired under different conditions.

11. The image processing device according to claim 10, wherein the plurality of second image data items have different exposure conditions.

12. The image processing device according to claim 9, wherein the image data acquisition unit acquires the second image data, in which the data in the frequency domain is acquired by the frequency analysis unit, from the plurality of second image data items on the basis of the number of components of the plurality of second image data items in a specific frequency range.

13. The image processing device according to claim 12, wherein the image data acquisition unit acquires second image data having the largest number of components in the specific frequency range as the second image data, in which the data in the frequency domain is acquired by the frequency analysis unit, from the plurality of second image data items.

14. The image processing device according to claim 12, wherein the specific frequency range is included in a range that is equal to or greater than one eighth of a sampling frequency of each of the plurality of second image data items and is equal to or less than one fourth of the sampling frequency.

15. The image processing device according to claim 1, wherein the sharpening filter is based on an optical transfer function of the first optical system.

16. The image processing device according to claim 1, wherein the sharpening filter is not based on an optical transfer function of the first optical system.

17. The image processing device according to claim 1,
wherein the filter acquisition unit acquires a plurality of sharpening filters associated with a plurality of image heights as the sharpening filter associated with the second optical system from the plurality of sharpening filters associated with the first optical system.

18. An imaging apparatus comprising:
an imaging element that receives an object image which has passed through an optical system and generates captured image data; and
the image processing device according to claim 1.

19. The imaging apparatus according to claim 18, further comprising:
a storage unit that stores the data in the frequency domain of the first image data,
wherein the frequency analysis unit acquires the data in the frequency domain of the first image data from the storage unit and acquires the data in the frequency domain of the second image data obtained by capturing the object image using the second optical system and the imaging element.

20. The imaging apparatus according to claim 18, further comprising:
a display unit;
a display control unit that controls the display unit; and
the second optical system,
wherein the display control unit displays a guide portion for prompting a user to take a first object image on the display unit, and
the second image data is the captured image data which is generated by an imaging operation prompted by the guide portion.

21. The imaging apparatus according to claim 20, further comprising:
an image determination unit that determines whether the captured image data which is generated by the imaging operation prompted by the guide portion meets a first criterion,
wherein the second image data is the captured image data that meets the first criterion.

22. The imaging apparatus according to claim 21,
wherein, in a case in which the captured image data which is generated by the imaging operation prompted by the guide portion does not meet the first criterion, the display control unit displays the guide portion for prompting the user to take the first object image on the display unit again.

23. An imaging processing method using the imaging apparatus according to claim 1, comprising:
acquiring data in the frequency domain of each of first image data which is acquired by capturing an object image using a first optical system and second image data which is acquired by capturing an object image using a second optical system,
wherein the first image data and the second image data are acquired by capturing the same object image;
comparing the data in the frequency domain of the first image data with the data in the frequency domain of the second image data to acquire frequency characteristic data related to optical characteristics of the second optical system; and
acquiring a sharpening filter associated with the second optical system from a plurality of sharpening filters associated with the first optical system, on the basis of the frequency characteristic data related to the optical characteristics of the second optical system.

24. A non-transitory computer readable recording medium storing program that causes the imaging apparatus according to claim 1, as a computer to perform:
a step of acquiring data in the frequency domain of each of first image data which is acquired by capturing an object image using a first optical system and second image data which is acquired by capturing an object image using a second optical system,
wherein the first image data and the second image data are acquired by capturing the same object image;
a step of comparing the data in the frequency domain of the first image data with the data in the frequency domain of the second image data to acquire frequency characteristic data related to optical characteristics of the second optical system; and
a step of acquiring a sharpening filter associated with the second optical system from a plurality of sharpening filters associated with the first optical system, on the basis of the frequency characteristic data related to the optical characteristics of the second optical system.

* * * * *